United States Patent
Ma et al.

(10) Patent No.: US 12,554,454 B2
(45) Date of Patent: Feb. 17, 2026

(54) ELECTRONIC APPARATUS, DISPLAY APPARATUS AND CONTROLLING METHOD THEREOF

(71) Applicant: SAMSUNG ELECTRONICS CO., LTD., Suwon-si (KR)

(72) Inventors: Jiyeon Ma, Suwon-si (KR); Daewung Kim, Suwon-si (KR); Donghun Shin, Suwon-si (KR); Dahye Shim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 108 days.

(21) Appl. No.: 17/554,899

(22) Filed: Dec. 17, 2021

(65) Prior Publication Data
US 2022/0129230 A1  Apr. 28, 2022

Related U.S. Application Data

(63) Continuation of application No. PCT/KR2021/015224, filed on Oct. 27, 2021.

(30) Foreign Application Priority Data

Oct. 28, 2020  (KR) .................... 10-2020-0141431

(51) Int. Cl.
*G06F 3/14*   (2006.01)
*G06F 3/0482* (2013.01)

(52) U.S. Cl.
CPC .......... *G06F 3/1454* (2013.01); *G06F 3/0482* (2013.01); *G06F 3/1423* (2013.01)

(58) Field of Classification Search
CPC ............................ G06F 3/1423; G06F 3/0482
See application file for complete search history.

(56) References Cited

U.S. PATENT DOCUMENTS

| 8,019,389 B2 | 9/2011 | Kim et al. |
| 9,652,193 B2 | 5/2017 | Seo et al. |
| (Continued) |

FOREIGN PATENT DOCUMENTS

| JP | 2014222432 A | 11/2014 |
| KR | 10-1420418 B1 | 7/2014 |
| (Continued) |

OTHER PUBLICATIONS

International Search Report (PCT/ISA/210) and Written Opinion (PCT/ISA/237) dated Jan. 27, 2022 issued by the International Searching Authority in International Application No. PCT/KR2021/015224.
Communication dated Nov. 15, 2023, issued by the European Patent Office in European Application No. 21886804.0.
(Continued)

*Primary Examiner* — Doon Y Chow
(74) *Attorney, Agent, or Firm* — Sughrue Mion, PLLC

(57) ABSTRACT

A display apparatus, including a communication interface; a display; and a processor configured to, based on an image being received from an electronic apparatus through the communication interface, display the received image on the display, wherein the image is generated based on an application selected according to a first user command, and is transmitted to the display apparatus while the electronic apparatus displays an image corresponding to a second user command input to the electronic apparatus.

20 Claims, 35 Drawing Sheets

(56) References Cited

U.S. PATENT DOCUMENTS

| | | | |
|---|---|---|---|
| 10,489,100 B2 | 11/2019 | Jaegal et al. | |
| 10,631,039 B2 | 4/2020 | Shin et al. | |
| 10,776,068 B2 | 9/2020 | Hong et al. | |
| 2010/0262673 A1* | 10/2010 | Chang | H04L 67/141 |
| | | | 715/764 |
| 2013/0326397 A1 | 12/2013 | Kim et al. | |
| 2014/0359493 A1* | 12/2014 | Hong | G06F 3/1454 |
| | | | 715/761 |
| 2015/0061970 A1* | 3/2015 | Kim | G06F 3/1423 |
| | | | 345/2.3 |
| 2015/0061972 A1 | 3/2015 | Seo et al. | |
| 2016/0027150 A1* | 1/2016 | Lee | G06T 3/60 |
| | | | 345/650 |
| 2016/0253142 A1 | 9/2016 | Choi et al. | |
| 2016/0261905 A1* | 9/2016 | Aruga | G02B 27/0172 |
| 2016/0328107 A1 | 11/2016 | Momchilov et al. | |
| 2017/0235435 A1 | 8/2017 | Sohn et al. | |
| 2017/0237930 A1* | 8/2017 | Kim | H04N 21/472 |
| | | | 348/554 |
| 2019/0212848 A1 | 7/2019 | Lee et al. | |
| 2022/0252880 A1* | 8/2022 | Kurachi | G06F 3/01 |

FOREIGN PATENT DOCUMENTS

| | | |
|---|---|---|
| KR | 10-2014-0140720 A | 12/2014 |
| KR | 10-2015-0026367 A | 3/2015 |
| KR | 10-2015-0050883 A | 5/2015 |
| KR | 1020160016335 A | 2/2016 |
| KR | 1020160031724 A | 3/2016 |
| KR | 10-2016-0102835 A | 8/2016 |
| KR | 10-2016-0105242 A | 9/2016 |
| KR | 1020160108732 A | 9/2016 |
| KR | 10-2017-0027435 A | 3/2017 |
| KR | 10-1730315 B1 | 4/2017 |
| KR | 10-2017-0076406 A | 7/2017 |
| KR | 10-2017-0081454 A | 7/2017 |
| KR | 10-2017-0096408 A | 8/2017 |
| KR | 10-1919788 B1 | 11/2018 |
| KR | 10-2097173 B1 | 5/2020 |

OTHER PUBLICATIONS

Communication issued on Feb. 11, 2025 by the Korean Intellectual Property Office in Korean Patent Application No. 10-2020-0141431.

* cited by examiner

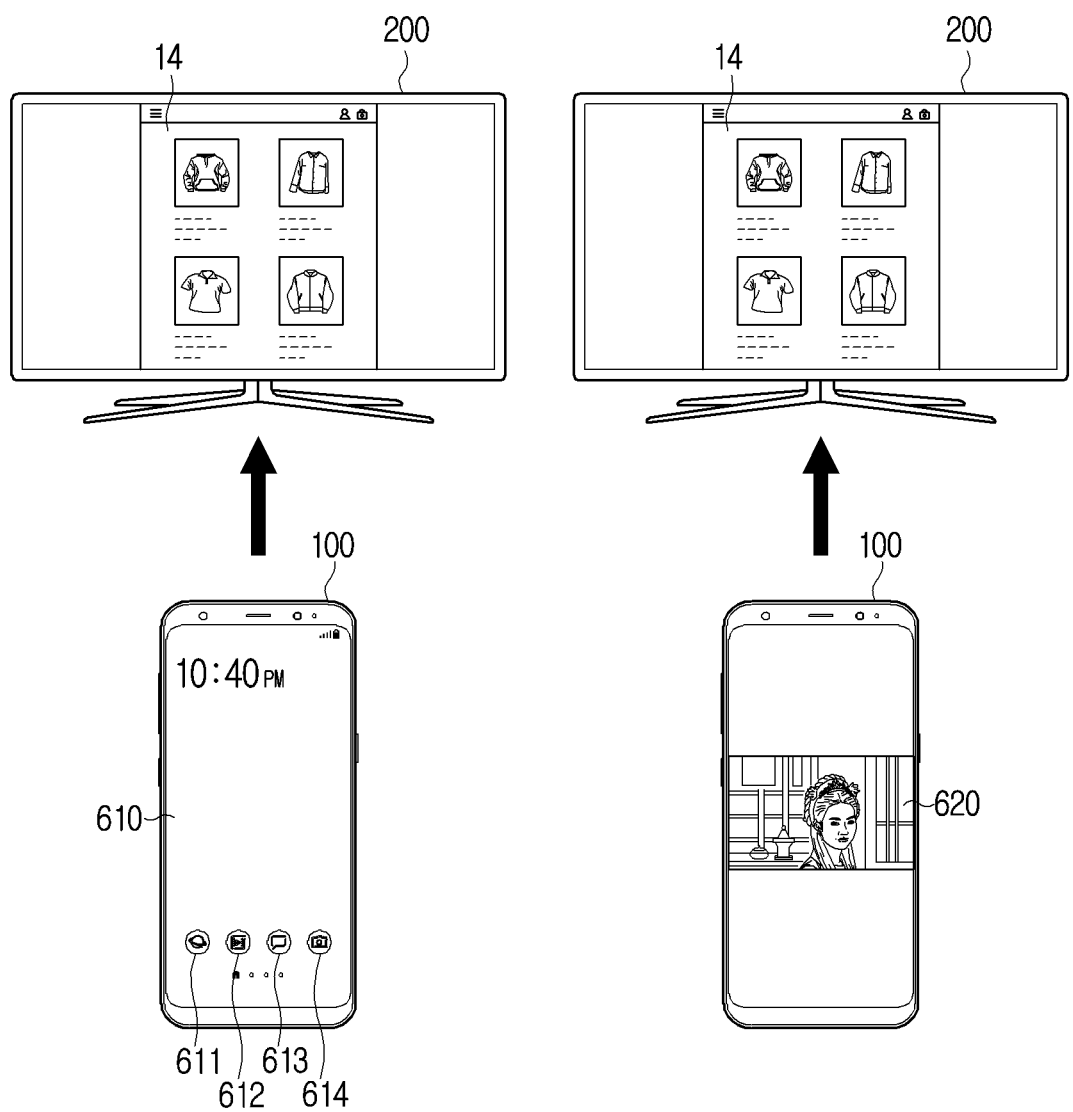

FIG. 17B
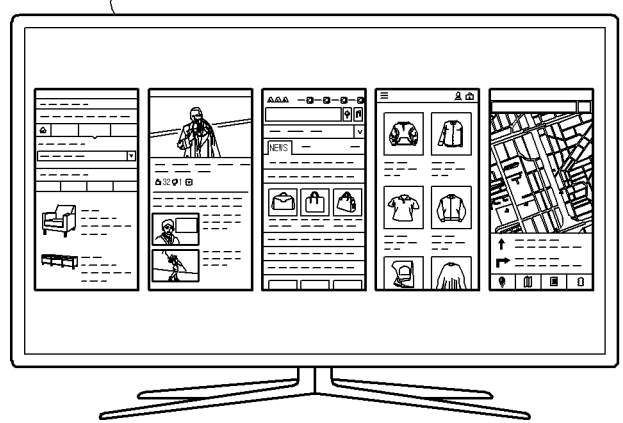

ELECTRONIC APPARATUS, DISPLAY APPARATUS AND CONTROLLING METHOD THEREOF

CROSS-REFERENCE TO RELATED APPLICATION(S)

This application is a bypass continuation of International Application No. PCT/KR2021/015224, filed on Oct. 27, 2021, which is based on and claims priority to Korean Patent Application No. 10-2020-0141431, filed on Oct. 28, 2020, in the Korean Intellectual Property Office, the disclosures of which are incorporated by reference herein in their entireties.

BACKGROUND

1. Field

The disclosure relates to an electronic apparatus, a display apparatus, and a controlling method thereof, and relates to an electronic apparatus which executes an application, a display device which displays an execution screen of the application executed on the electronic apparatus, and a controlling method thereof.

2. Description of the Related Art

Along with recent development of electronic technologies, portable electronic apparatuses such as smartphones and tablet personal computers (PCs) may support various functions such as the Internet and reproduction of multimedia contents, in addition to functions of call and message transmission and reception. For this, the electronic apparatus may execute an application providing such various functions and display an image provided from the application.

An electronic apparatus may provide an image sharing function for displaying the image displayed on the electronic apparatus through a display apparatus connected to the electronic apparatus. Such an image sharing function, for example mirroring, may be performed by displaying a screen itself being displayed on the electronic apparatus through the display apparatus, and accordingly, a problem regarding a decrease in applicability of the user on the electronic apparatus during the mirroring may occur.

SUMMARY

Embodiments of the disclosure provide an electronic apparatus capable of allowing the electronic apparatus to display a screen provided from an application on a display apparatus while a user is able to perform various functions through the electronic apparatus, a display apparatus, and a controlling method thereof.

According to an aspect of the disclosure, a display apparatus includes a communication interface; a display; and a processor configured to, based on an image being received from an electronic apparatus through the communication interface, display the received image on the display, wherein the image is generated based on an application selected according to a first user command, and is transmitted to the display apparatus while the electronic apparatus displays an image corresponding to a second user command input to the electronic apparatus.

The processor may be further configured to: based on the image and metadata of the application being received from the electronic apparatus through the communication interface, identify a category of the application based on the metadata; and display the received image on the display based on the identified category.

The processor may be further configured to: based on a plurality of images being received through the communication interface, display the plurality of images on the display, the plurality of images may be generated based on a plurality of applications, and the plurality of images may be received from the electronic apparatus, or from a plurality of electronic apparatuses.

An arrangement state of the plurality of images may be determined based on an arrangement state of the electronic apparatus based on each application.

The processor may be further configured to, based on the image being received from the electronic apparatus through the communication interface while the plurality of images are displayed on the display, remove one of the plurality of images and display the received image on the display.

The processor may be further configured to: based on the plurality of images being received from the plurality of electronic apparatuses, identify positions of the plurality of images to be displayed on the display based on directions in which the plurality of electronic apparatuses are located relative to the display apparatus; and display the plurality of images on the display based on the identified positions.

The processor may be further configured to: based on the plurality of images being received from the plurality of electronic apparatuses, identify a number of images to be displayed on the display based on a distance between the display apparatus and the plurality of electronic apparatuses; and display the identified number of images among the plurality of images on the display.

According to an aspect of the disclosure, an electronic apparatus includes a memory; a display; a communication interface; and a processor configured to: based receiving on a first user command for selecting an application to be transmitted to a display apparatus among a plurality of applications stored in the memory, generate an image based on the selected application; transmit the generated image to the display apparatus through the communication interface; and based on a second user command being input, display an image corresponding to the second user command on the display while transmitting the generated image to the display apparatus.

The processor may be further configured to, based on a plurality of images displayed on the display apparatus being received from the display apparatus through the communication interface, display the plurality of images on the display, and the plurality of images may be generated based on a plurality of electronic apparatuses and transmitted to the display apparatus.

The processor may be further configured to, based on a third user command corresponding to one image among the plurality of images being input, transmit the third user command to the display apparatus through the communication interface.

According to an aspect of the disclosure, a method for controlling a display apparatus includes receiving an image from an electronic apparatus; and displaying the received image, wherein the image is generated based on an application selected according to a first user command, and transmitted to the display apparatus, while the electronic apparatus displays an image corresponding to a second user command input to the electronic apparatus.

The displaying may include, based on the image and metadata of the application being received from the electronic apparatus, identifying a category of the application based on the metadata and displaying the image based on the identified category.

The displaying may include, based on a plurality of images being received, displaying the plurality of images, the plurality of images may be generated based on a plurality of applications, and the plurality of images may be received from the electronic apparatus or received from a plurality of electronic apparatuses.

An arrangement state of the plurality of images may be determined based on an arrangement state of the electronic apparatus based on each application.

The displaying may include, based on the image being received from the electronic apparatus while the plurality of images are displayed on the display, removing one of the plurality of displayed images and displaying the image.

According to an aspect of the disclosure, a method for controlling an electronic apparatus includes based receiving on a first user command for selecting an application, generating a first image based on the application; transmitting the image to a display apparatus; and based on receiving second user command, displaying a second image corresponding to the second user command on a display of the electronic apparatus while the first image is displayed on the display apparatus.

The first image may be an execution image of the application, and the first image may be not displayed on the display of the electronic apparatus while the first image is displayed on the display apparatus.

A display position of the first image with on the display apparatus may be determined based on a physical position of the electronic apparatus with respect to the display apparatus.

The first image may be displayed on the display apparatus along with a plurality of images corresponding to a plurality of electronic apparatuses, and the display position of the first image is further determined based on physical positions of the plurality of electronic apparatuses with respect to the display apparatus.

According to the various embodiments of the disclosure, in addition to an image displayed on its display, the electronic apparatus may render an image to be transmitted to the display apparatus based on the execution of the application and transmit the rendered image to the display apparatus. Therefore, a user is able to be provided with various functions through the electronic apparatus while being provided with an execution screen of the application through the display apparatus provided with a comparatively large display, thereby enhancing user's convenience.

BRIEF DESCRIPTION OF THE DRAWINGS

FIGS. 6A and 6B are diagrams illustrating various examples of screens displayed on the electronic apparatus while the execution screen of the application is transmitted to the display apparatus according to an embodiment;

FIG. 17B is a diagram illustrating a number of execution screens displayed on the display apparatus according to an embodiment;

DETAILED DESCRIPTION

Figure 1:
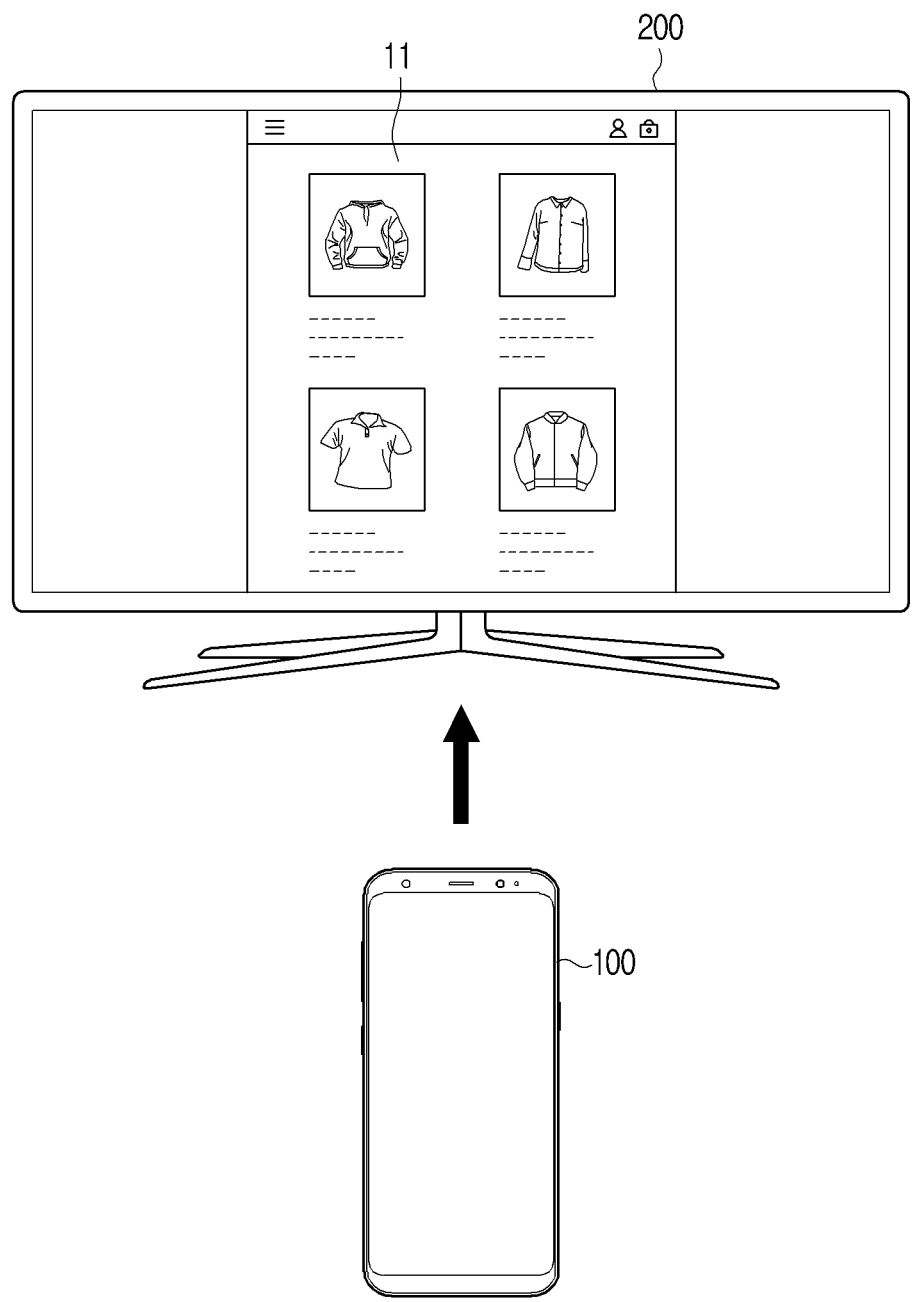
FIG. 1 is a diagram illustrating a method for displaying an image received from an electronic apparatus by a display apparatus according to an embodiment.

Hereinafter, various embodiments of the disclosure will be described with reference to the accompanying drawings. It should be noted that the technologies disclosed in this disclosure are not for limiting the scope of the disclosure to a specific embodiment, but they should be interpreted to include all modifications, equivalents and/or alternatives of the embodiments of the disclosure. In relation to explanation of the drawings, similar reference numerals may be used for similar elements.

In this disclosure, the terms such as "comprise", "may comprise", "consist of", or "may consist of" are used herein to designate a presence of corresponding features (e.g., constituent elements such as number, function, operation, or part), and not to preclude a presence of additional features.

In this disclosure, expressions such as "A or B", "at least one of A [and/or] B,", or "one or more of A [and/or] B,", include all possible combinations of the listed items. For example, "A or B", "at least one of A and B,", or "at least one of A or B" includes any of (1) at least one A, (2) at least one B, or (3) at least one A and at least one B.

The expressions "first," "second" and the like used in the disclosure may denote various elements, regardless of order and/or importance, and may be used to distinguish one element from another, and does not limit the elements.

If it is described that a certain element (e.g., first element) is "operatively or communicatively coupled with/to" or is "connected to" another element (e.g., second element), it should be understood that the certain element may be connected to the other element directly or through still another element (e.g., third element). On the other hand, if it is described that a certain element (e.g., first element) is "directly coupled to" or "directly connected to" another element (e.g., second element), it may be understood that there is no element (e.g., third element) between the certain element and another element.

A term such as "module" or a "unit" in the disclosure may perform at least one function or operation, and may be implemented as hardware, software, or a combination of hardware and software. Further, except for when each of a plurality of "modules", "units", and the like needs to be realized in an individual hardware, the components may be integrated in at least one module and be implemented in at least one processor.

Also, the expression "configured to" used in the disclosure may be interchangeably used with other expressions such as "suitable for," "having the capacity to," "designed to," "adapted to," "made to," and "capable of," depending on cases. In embodiments, the expression "configured to" does not necessarily refer to a device being "specifically designed to" in terms of hardware. Instead, under some circumstances, the expression "a device configured to" may refer to the device being "capable of" performing an operation together with another device or component. For example, the phrase "a unit or a processor configured (or set) to perform A, B, and C" may refer, for example, and without limitation, to a dedicated processor (e.g., an embedded processor) for performing the corresponding operations, a generic-purpose processor (e.g., a central processing unit (CPU) or an application processor), or the like, that can perform the corresponding operations by executing one or more software programs stored in a memory device.

FIG. 1 is a diagram illustrating a method for displaying an image received from an electronic apparatus by a display apparatus according to an embodiment.

Referring to FIG. 1, an electronic apparatus 100 may be implemented as a smartphone. However, the electronic apparatus 100 according to the disclosure is not limited to a specific type of apparatus, and may also be implemented as various types of electronic apparatuses such as a tablet PC, a personal digital assistant (PDA), a smart watch, a laptop computer, a virtual reality (VR) device, and Internet of Things (IoT).

In addition, a display apparatus 200 may be implemented as a TV. However, the display apparatus 200 according to the disclosure is not limited to a specific type of apparatus, and may also be implemented as various types of electronic apparatuses such as a smartphone, a tablet personal computer (PC), a desktop PC, a laptop PC, and Internet of Things (IoT) device.

Referring to FIG. 1, the display apparatus 200 receives an image from the electronic apparatus 100 and displays a received image 11.

Here, the image 11 may refer to an image provided by an application executed on the electronic apparatus 100. In other words, the image 11 may refer to an execution screen of the application.

Specifically, the electronic apparatus 100 may execute an application stored (or installed) in the electronic apparatus 100 and transmit the image 11 generated based on the executed application to the display apparatus 200. In this case, the display apparatus 200 may display the image 11 received from the electronic apparatus 100.

In this case, in addition to an image displayed on its display, the electronic apparatus 100 may render an image to be transmitted to the display apparatus 200 based on the execution of the application and transmit the rendered image to the display apparatus 200. Accordingly, a user may be provided with various functions through the electronic apparatus 100 while being provided with an execution screen of the application through the display apparatus 200 provided with a comparatively large display, thereby enhancing user's convenience.

Figure 2:
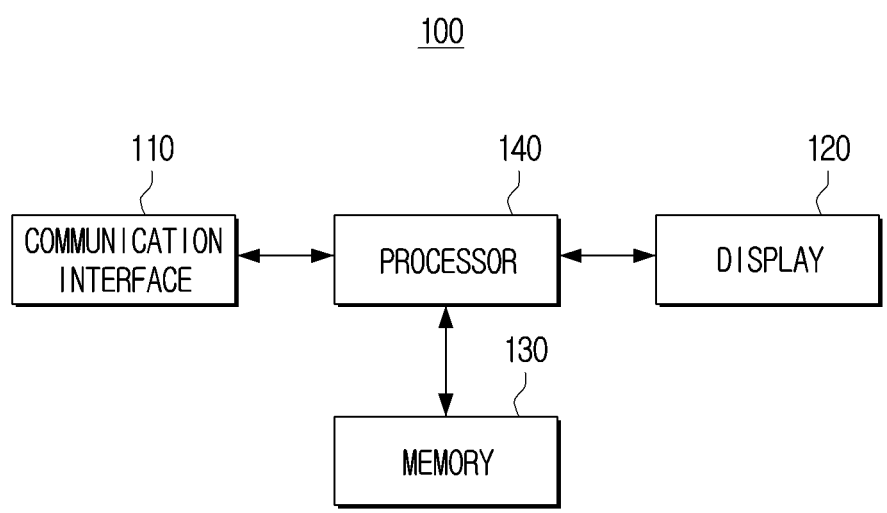
FIG. 2 is a block diagram illustrating a configuration of the electronic apparatus according to an embodiment.

FIG. 2 is a block diagram illustrating a configuration of the electronic apparatus according to an embodiment.

Referring to FIG. 2, the electronic apparatus 100 may include a communication interface 110, a display 120, a memory 130, and a processor 140.

The communication interface 110 may include circuitry and may communicate with an external electronic apparatus (e.g., display apparatus 200). Specifically, the communication interface 110 may establish a wireless communication channel with the external electronic apparatus and perform the communication through the established communication channel.

In this case, the communication interface 110 may include a Wi-Fi module and may communicate with the external apparatus through a network by using a Wi-Fi communication method.

The display 120 may display various screens. In this case, the display 120 may be implemented as a liquid crystal display (LCD), an organic light emitting diode (OLED), and the like, and may also be implemented as a touch screen capable of simultaneously performing a function of detecting a touch, in addition to a display function.

The memory 130 may store data used by at least one constituent element of the electronic apparatus 100. Here, the data may include, for example, software and various pieces of data related thereto. In this case, the memory 130 may include a volatile memory and a non-volatile memory. The software may include an operating system (e.g., Android) and an application. In embodiments, memory 130 may include a read-only memory (ROM) and a random-access memory (RAM) in the processor 140, or a memory card (e.g., micro SD card or memory stick) mounted on the electronic apparatus 100.

The processor 140 may control general operations of the electronic apparatus 100. Specifically, the processor 140 may be connected to the electronic apparatus 100 including the communication interface 110, the display 120, and the memory 130, and may control the operations of the electronic apparatus 100. In this case, the processor 140 may be implemented as one processor 140 and may also be implemented as a plurality of processors 140. In embodiments, the processor 140 may include an application processor.

When a first user command for selecting an application to be transmitted to the display apparatus 200 among a plurality of applications stored in the memory 130 is received, the processor 140 may generate an image based on the selected application.

Here, the first user command may be a user command that is different from a user command for executing the application stored in the electronic apparatus 100 to display the application on the display 120.

For example, the user command for executing the application stored in the electronic apparatus 100 to display the application on the display 120 may be a user command for selecting (e.g., touching user command) an icon corresponding to the application stored in a home screen of the electronic apparatus 100.

In this case, when the user command is input, the processor 140 may execute the application and render images provided from the application according to the execution of the application and store the images in at least one buffer. In addition, the processor 140 may render images such as notification bars, or status bars, indicating a current state of the electronic apparatus 100, for example, a radio wave intensity from a base station, data communication, time, battery power, and the like, and store the images in at least one buffer.

The processor 140 may compose the entirety or at least some images, or layers, stored in a plurality of buffers, generate an image, and display the generated image on the display 120.

In embodiments, the first user command may be a user command for moving (e.g., drag-and-drop user command) an icon corresponding to the application displayed on the display 120 to a region displayed on the display 120.

Figures 3A, 3B, 3C:
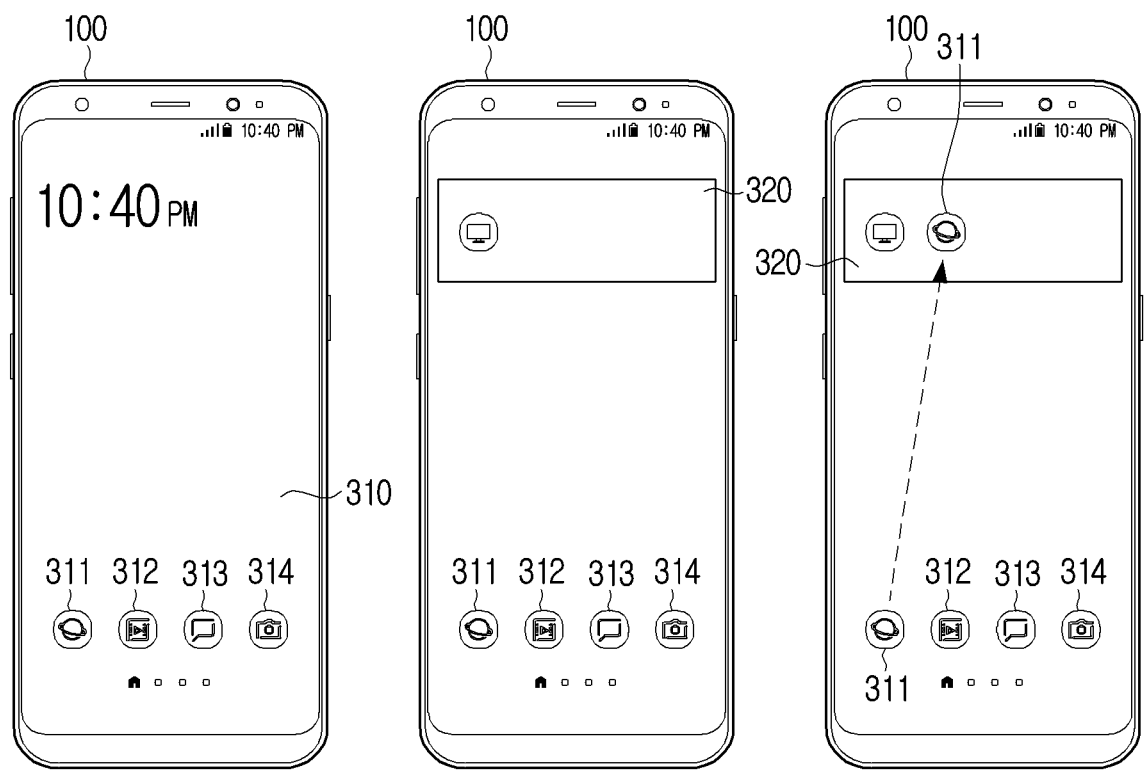
FIGS. 3A, 3B, and 3C are diagrams illustrating a method for selecting an application to be transmitted to the display apparatus according to an embodiment.

For example, referring to FIG. 3A, the processor 140 may display a home screen 310 including icons 311, 312, 313, and 314 corresponding to applications stored in the memory 130 on the display 120.

In this case, when the user command is input to the electronic apparatus 100, the processor 140 may display a region 320, referring to FIG. 3B. Here, the user command may be, for example, a user command for inputting touch (e.g., flicking, swiping, or dragging user command, or the like) in one direction and selecting a button displayed on the display 120, but there is no limitation thereto.

In this case, referring to FIG. 3C, the first user command may be a user command for moving one icon 311 among the icons 311, 312, 313, and 314 displayed on the home screen 310 to the region 320. In this case, referring to FIG. 3C, the icon 311 may be displayed on the region 320.

Figures 4A, 4B, 4C:
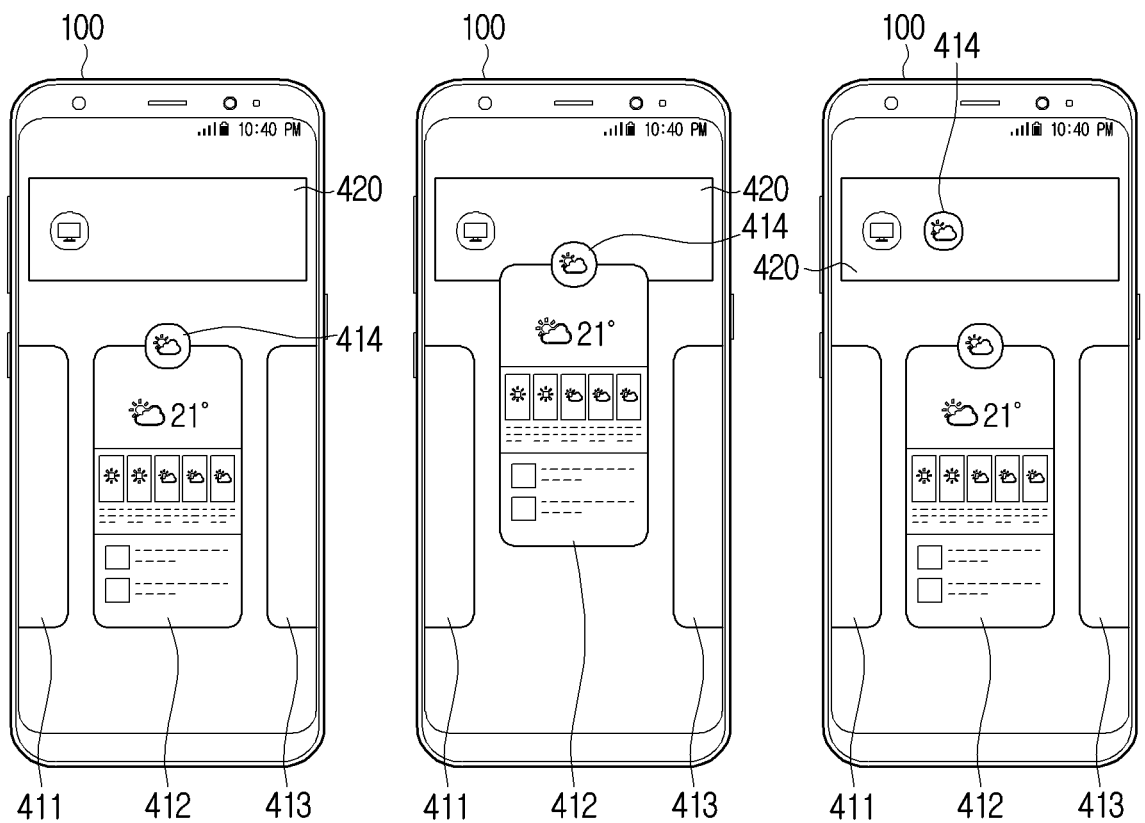
FIGS. 4A, 4B, and 4C are diagrams illustrating a method for selecting an application to be transmitted to the display apparatus according to an embodiment.

In another example, referring to FIG. 4A, when the user command is input to the electronic apparatus 100, the processor 140 may display execution screens 411, 412, and 413 of applications that are being executed in the background and a region 420 on the display 120. In this case, the processor 140 may display an icon corresponding to the application on the execution screen of each application. For example, referring to FIG. 4A, the icon 414 may be displayed on the execution screen 412 of the applications.

Here, the user command may be, for example, a user command for selecting a button displayed on the display 120 or a user command for selecting a physical button of the electronic apparatus 100, and there is no limitation thereto.

In this case, referring to FIG. 4B, the first user command may be a user command for moving one icon 414 among the icons corresponding to the application to the region 420. In this case, referring to FIG. 4C, the icon 414 may be displayed on the region 420.

When the first user command is input, the processor 140 may generate an image based on the selected application.

Specifically, the processor 140 may render an image to be transmitted to the display apparatus 200, separately from an image (e.g., home screen, execution screen of the application, or the like) displayed on a primary display, that is, the display 120.

In this case, the processor 140 may render the image provided from the selected application through a virtual display.

Specifically, presence of a display other than the main display is recognized by the virtual display, and the processor 140 may render an image provided from the application, that is, the execution screen of the application according to the execution of the selected application through the virtual display and store the image in at least one buffer, and compose the images stored in at least one buffer to generate an image.

In this case, the processor 140 may transmit the generated image to the display apparatus 200 through the communication interface 110.

Specifically, the processor 140 may encode generated image frames by using an encoder, and transmit the encoded image frames to the display apparatus 200 through a Wi-Fi socket. In this case, for the encoding, an encoding method such as H.264 encoding may be used, for example.

In the example above, processor 140 is described as generating the image in application unit and transmitting the generated image to the display apparatus 200, but there is no limitation to this example, and the processor 140 may transmit the image in a task unit provided from the application to the display apparatus 200.

Here, the task may refer to a job unit provided from one application. For example, in a case of an application for providing the Internet service, a plurality of web pages may be provided. In this case, one web page may be one task.

For example, referring to an example FIGS. 4A, 4B, and 4C, the processor 140 may display a plurality of web pages being executed in the background on the display 120. In this case, the processor 140 may display an icon on each web page. In this case, the first user command may be a user command for moving one icon among the icons corresponding to the web page to a region. Accordingly, when the first user command is input, the processor 140 may transmit the web page to the display apparatus 200 through the communication interface 110.

In embodiments, the processor 140 may transmit metadata of the executed application to the display apparatus 200 through the communication interface 110. Here, the metadata may include various pieces of information related to the application such as a name, a description, and the like of the application.

In addition, if audio is provided by the executed application, the processor 140 may transmit the audio to the display apparatus 200 through the communication interface 110. For example, in a case of an application for streaming and reproducing a video or reproducing the stored video, the audio may be provided along with an image. In this case, the processor 140 may transmit the execution screen (that is, video) and the audio of the application to the display apparatus 200 through the communication interface 110. In this case, the display apparatus 200 may display the execution screen received from the electronic apparatus 100 and output the received audio through the speaker.

In embodiments, if the plurality of applications to be transmitted to the display apparatus 200 are selected, the processor 140 may generate a plurality of images based on the plurality of selected applications. In other words, the processor 140 may execute each of the plurality of applications and transmit the image provided from each application to the display apparatus 200 through the communication interface 110.

Figure 5:
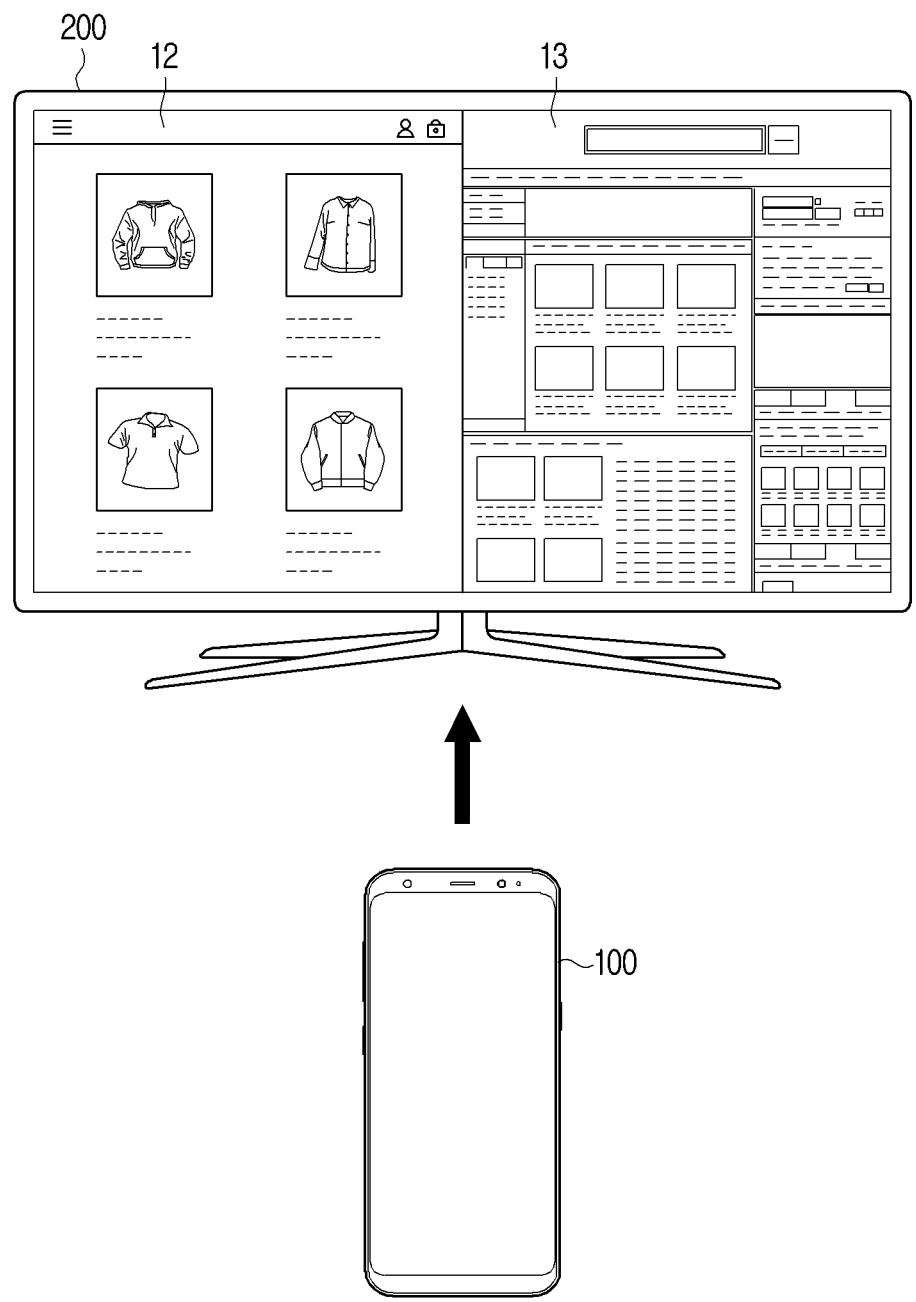
FIG. 5 is a diagram illustrating an example in which the electronic apparatus transmits an execution screen of the application to the display apparatus according to an embodiment.

For example, referring to FIG. 5, the processor 140 may transmit execution screens 12 and 13 of the plurality of applications to the display apparatus 200 through the communication interface 110. In this case, the display apparatus 200 may display the execution screens 12 and 13 of the applications received from the electronic apparatus 100.

In embodiments, when the second user command is input, the processor 140 may display an image corresponding to the second user command on the display 120 while transmitting the generated image to the display apparatus 200.

Here, the second user command may include a user command for displaying a home screen, a user command for displaying an image provided by the application, and the like.

Specifically, while transmitting the execution screen provided from the application executed based on the first user command to the display apparatus 200, the processor 140 may display the home screen on the display 120 based on the second user command or execute the application based on the second user command, and display the image provided by the executed application, that is, the execution screen of the application on the display 120.

For example, when the application to be transmitted to the display apparatus 200 is selected, referring to FIG. 6A, the processor 140 may execute the selected application and transmit an execution screen 11 of the application to the display apparatus 200 through the communication interface 110. In this case, the display apparatus 200 may display an execution screen 14 received from the electronic apparatus 100.

Here, for example, it is assumed that the application to be transmitted to the display apparatus 200 is selected through the method described with reference to FIG. 3.

In this case, when the user command for removing a region displayed on the home screen is input, referring to FIG. 6A, the processor 140 may display a home screen 610 on the display 120. Here, the user command may be, for example, a user command for inputting touch (e.g., flicking, swiping, or dragging user command, or the like) in one direction and selecting a button displayed on the display 120, but there is no limitation thereto.

In another example, it is assumed that the application to be transmitted to the display apparatus 200 is selected through the method described with reference to FIG. 4.

In this case, when the user command for displaying a home screen is input, referring to FIG. 6A, the processor 140 may display a home screen 610 on the display 120. Here, the user command may be a user command for selecting a button displayed on the display 120 or a user command for selecting a physical button of the electronic apparatus 100, but there is no limitation thereto.

In such cases, when a user command for selecting one icon among icons 611, 612, 613, and 614 included in the home screen 610 is input, the processor 140 may execute an application corresponding to the icon and display an execution screen of the application on the display 120. For example, referring to FIG. 6B, when a video application is executed, the processor 140 may display a video 620 provided by the video application on the display 120.

As described above, according to an embodiment, since the user is able to execute another application through the electronic apparatus 100 while being provided with the execution screen of the application through the display apparatus 200 provided with a comparatively large screen, multitasking can be performed thereby enhancing the user's convenience.

In embodiments, when a user command for displaying an image is transmitted to the electronic apparatus 100, the processor 140 may display the image being transmitted to the electronic apparatus 100 on the display 120.

Figures 7A, 7B:
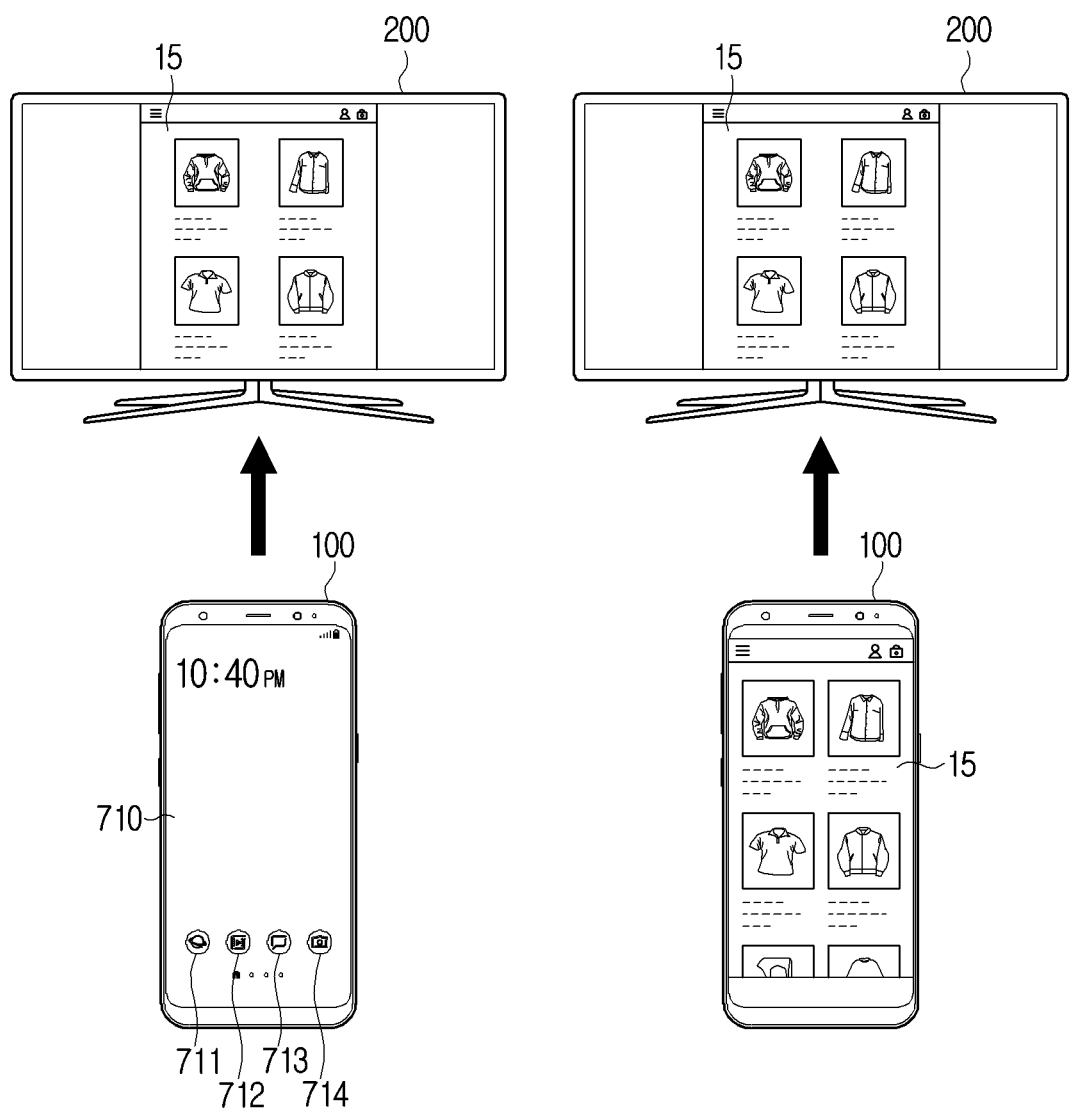
FIGS. 7A and 7B are diagrams illustrating various examples of screens displayed on the electronic apparatus while the execution screen of the application is transmitted to the display apparatus according to an embodiment.

For example, referring to FIG. 7A, it is assumed that the display apparatus 200 displays an execution screen 15 of an application received from the electronic apparatus 100.

In this case, when a user command for selecting an icon 711 corresponding to the application which provides the execution screen being transmitted to the electronic apparatus 100 among icons 711, 712, 713, and 714 included in the home screen 710 is input, referring to FIG. 7B, the processor 140 may display an execution screen 15 being transmitted to the electronic apparatus 100 on the display 120.

In embodiments, an arrangement state of the image displayed on the display apparatus 200 may be determined based on an arrangement state of the electronic apparatus 100 which displays the image generated based on the application.

Specifically, if a posture of the electronic apparatus 100 is a landscape posture, the processor 140 may generate an image having a width greater than a height and transmit the image to the display apparatus 200 through the communication interface 110, and if the posture of the electronic apparatus 100 is a portrait posture, the processor 140 may generate an image having a height greater than a width and transmit the image to the display apparatus 200 through the communication interface 110.

Figures 8A, 8B:
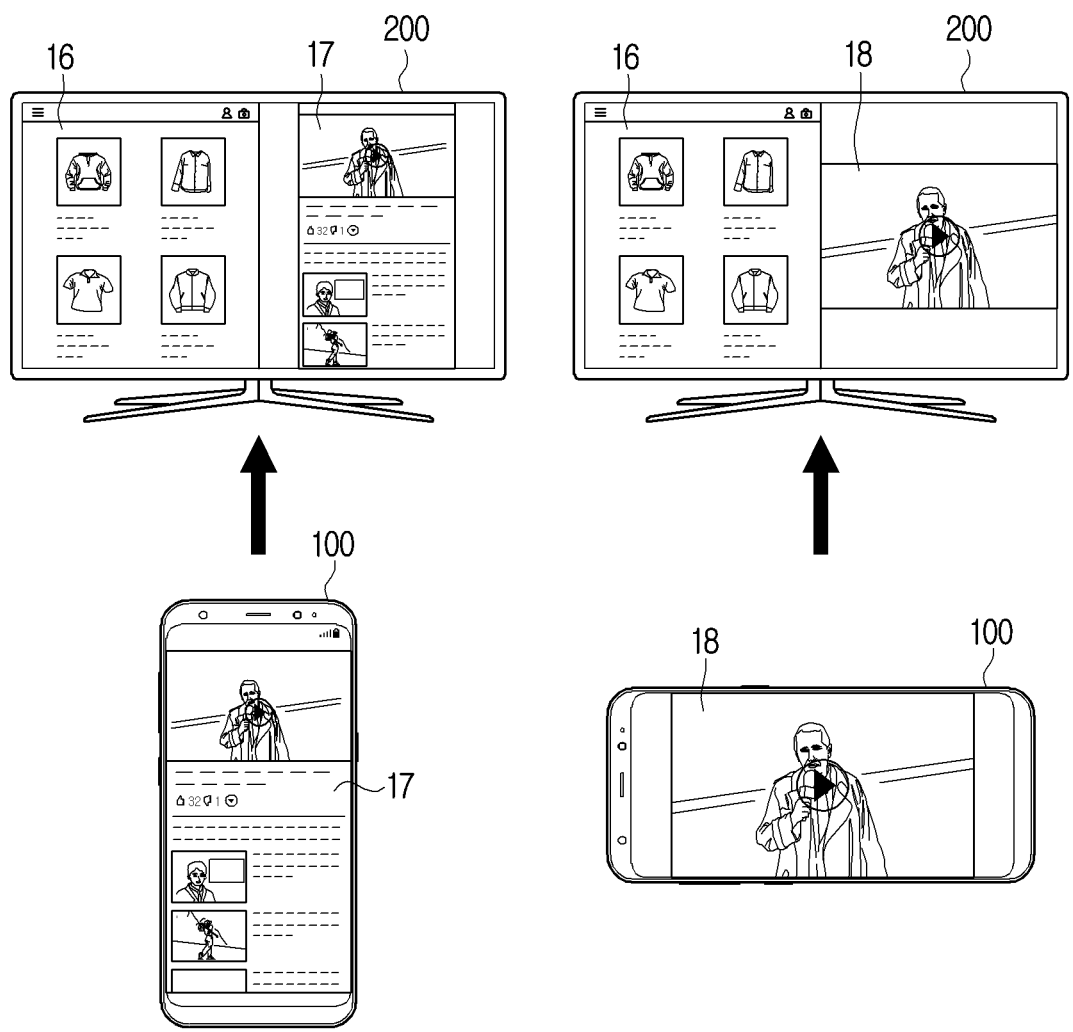
FIGS. 8A and 8B are diagrams illustrating an example in which the electronic apparatus transmits the execution screen of the application to the display apparatus according to an embodiment.

For example, referring to FIG. 8A, it is assumed that the display apparatus 200 displays execution screens 16 and 17 of a plurality of applications received from the electronic apparatus 100. Here, the processor 140 may display the execution screen 17 among the execution screens 16 and 17 transmitted to the display apparatus 200 on the display 120 based on the user command.

Referring to FIG. 8B, when the posture of the electronic apparatus 100 is changed from the portrait posture to the landscape posture, the processor 140 may adjust a size of the execution screen 17 based on the landscape posture, and display an execution screen 18 with the adjusted size on the display 120. The processor 140 may transmit the execution screen 18 with the adjusted size to the display apparatus 200 through the communication interface 110. Accordingly, the display apparatus 200 may display the execution screen 16 and the execution screen 18 with the adjusted size.

In embodiments, when a user command for the application is input in a state where the image being transmitted to the electronic apparatus 100 is displayed on the display 120, the processor 140 may display the image provided from the application on the display 120 based on the user command. In this case, the processor 140 may transmit the image provided from the application on the display apparatus 200 through the communication interface 110 based on the user command.

Here, the user command may include various user commands capable of being input to the application for controlling the application.

For example, it is assumed that, in a state where a web page provided from the application is displayed on the display 120, a user command for selecting a menu for moving to another web page included in the web page is input. In this case, the application may provide an execution screen including the other web page according to a user command. Accordingly, the processor 140 may display the other web page provided from the application on the display 120 and provide the other web page on the display apparatus 200 through the communication interface 110.

In another example, it is assumed that, in a state where a web page provided from an application is displayed on the display 120, a user command for scrolling the web page is input. In this case, the web page is scrolled according to the user command of the application and an execution screen including the scrolled web page may be provided. Accordingly, the processor 140 may display the scrolled web page provided from the application on the display 120 and transmit the scrolled web page to the display apparatus 200 through the communication interface 110.

As described above, according to an embodiment, since the user may control the execution screen displayed on the display apparatus 200 through the electronic apparatus while being provided with the execution screen of the application through the display apparatus 200 provided with a comparatively large display, the user's convenience may be enhanced.

In embodiments, as described above, the display apparatus 200 may receive an image from the electronic apparatus 100 and display the received image, and this will be described below in detail.

Figure 9:
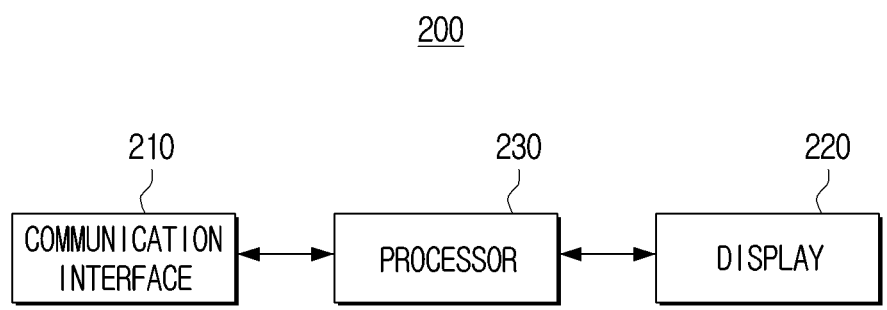
FIG. 9 is a block diagram illustrating a configuration of the display apparatus according to an embodiment.

FIG. 9 is a block diagram illustrating a configuration of the display apparatus according to an embodiment.

Referring to FIG. 9, the display apparatus 200 may include a communication interface 210, a display 220, and a processor 230.

The communication interface 210 may include circuitry and communicate with an external electronic apparatus (e.g., electronic apparatus 100). Specifically, the communication interface 210 may establish a wireless communication channel with the external electronic apparatus and perform the communication through the established communication channel.

In this case, the communication interface 210 may include a Wi-Fi module and may communicate with the external apparatus through a network by using a Wi-Fi communication method.

The display 220 may display various screens. In this case, the display 220 may be implemented as a liquid crystal display (LCD), an organic light emitting diode (OLED), and the like.

The processor 230 may control general operations of the display apparatus 200. Specifically, the processor 230 may be connected to the configuration of the display apparatus 200 including the communication interface 210 and the display 220, and may control the operations of the display apparatus 200. In this case, the processor 230 may be implemented as one processor 230 and may also be implemented as a plurality of processors 230. In embodiments, the processor 230 may be used as meaning including a central processing unit (CPU), a graphic processing unit (GPU), and a main processing unit (MPU).

When an image generated based on an application selected according to the first user command is received from the electronic apparatus 100 through the communication interface 210, the processor 230 may display the received image on the display 220.

Here, the image may be generated based on the application and transmitted to the display apparatus 200 while the electronic apparatus 100 displays an image corresponding to the second user command input to the electronic apparatus 100.

In other words, as described above, in addition to the image displayed on the display 120 of the electronic apparatus 100, the electronic apparatus 100 may generate an image provided from the application and transmit the generated image to the display apparatus 200.

In this case, when the encoded image frames are received from the electronic apparatus 100 through the Wi-Fi socket, the processor 230 may decode the received image frames by using a decoder to obtain the image frames and display the image frames on the display 220. In this case, for the decoding, a decoding method such as H.264 decoding may be used, for example.

In addition, when a plurality of images generated based on a plurality of applications are received through the communication interface 210, the processor 230 may display the plurality of received images on the display 220.

Here, the plurality of images may be generated based on the plurality of applications of the electronic apparatus 100 and received from the electronic apparatus 100, or may be generated based on the plurality of applications of the plurality of electronic apparatuses and received from the plurality of electronic apparatuses.

Figures 10A, 10B:
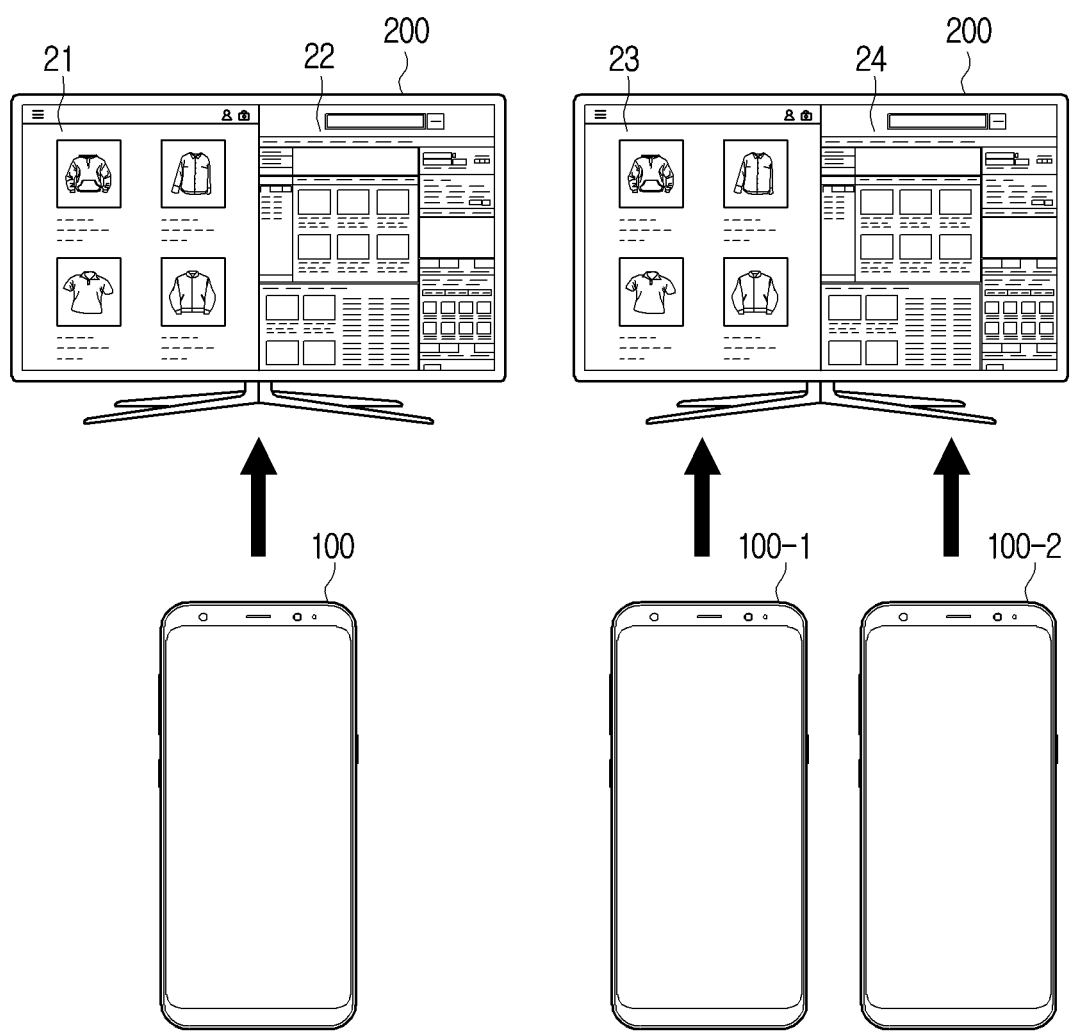
FIGS. 10A and 10B are diagrams illustrating an example in which at least one electronic apparatus transmits execution screens of a plurality of applications to the display apparatus according to an embodiment.

For example, referring to FIG. 10A, a plurality of execution screens may be generated on one electronic apparatus 100 and transmitted to the display apparatus 200. In this case, the processor 230 may display the plurality of received images 21 and 22 on the display 220. As another example, referring to FIG. 10B, at least one execution screen may be generated from each of a plurality of electronic apparatuses 100-1 and 100-2 and transmitted to the display apparatus 200. In this case, the processor 230 may display the plurality of received 23 and 24 on the display 220.

In embodiments, when an image generated based on the application and metadata of the application are received from the electronic apparatus 100 through the communication interface 210, the processor 230 may identify a category of the application based on the metadata.

Here, the category of the application may be divided according to a service provided from the application.

For example, if the application is an application for providing Webtoon, an electronic book, and the like, the application may be an application belonging to a reading category. If the application is an application for streaming and providing a video or reproducing a video stored in the electronic apparatus 100, the application may be an application belonging to a video category. In addition, if the application is an application for providing a chat service, the application may be an application belonging to a chat category. In addition, if the application is an application for providing a search service, the application may be an application belonging to a search category. If the application is an application for providing a memo function, the application may be an application belonging to a memo category. If the application is an application for providing a service such as pathfinding, location search, and the like using a map, the application may be an application belonging to a map category. If the application is an application for providing social network services (SNS), the application may be an application belonging to an SNS category. However, there is no limitation to these examples, and there are various categories of the applications.

In this case, the processor 230 may identify the category of the application based on information for a name of an application included in metadata of the application.

For this, the processor 230 may obtain information for a category to which the application belongs, for each name of the application. The information may be pre-stored in the display apparatus 200 or obtained from an external server.

The processor 230 may identify a category to which the application belongs, by using information for the name of the application included in the metadata of the application.

Next, the processor 230 may display the received image on the display 220 based on the identified category. In this case, the processor 230 may display the received image on the display 220 by different methods according to the identified category.

For example, if the application belongs to the reading category, the processor 230 may display a scrollable execution screen on the display 220. For this, the processor 230 may transmit the category information of the application to the electronic apparatus 100 through the communication interface 210. In this case, the processor 140 may identify that the execution screen transmitted to the display apparatus 200 is generated by the application which belongs to the reading category based on the category information received from the display apparatus 200, generate the scrollable execution screen of the reading application, and transmit the generated execution screen to the display apparatus 200. In this case, the processor 230 may display the execution screen received from the electronic apparatus 100 on the display 220. Accordingly, the execution screen of the application is scrolled and displayed on the display 220, and the user may be provided with a content scrolled on the display 220, without inputting a separate user command to the electronic apparatus 100.

In another example, if the application belongs to the video category, the execution screen of the application may include a video and a user interface for controlling the video. In this case, the processor 230 may display only a video on the display 220, without the user interface among the execution screen of the application received from the electronic apparatus 100.

In another example, it is assumed that the execution screens of the plurality of applications belonging to the video category are received. In this case, audio provided from each application may be received along with the execution screen. In this case, the processor 230 may display the user interface for selecting the application which outputs the plurality of execution screens and the audio on the display 220. The processor 230 may output the audio selected through the user interface among the plurality of received audios through a speaker.

In another example, if the application belongs to the chat category, the processor 230 may display only a message screen on the display 220. For this, the processor 230 may transmit the category information of the application to the electronic apparatus 100 through the communication interface 210. In this case, the processor 140 may identify that the execution screen transmitted to the display apparatus 200 is generated by the application belonging to the chat category based on the category information received from the display apparatus 200, and transmit only the message screen among the execution screens of the application to the display apparatus 200 through the communication interface 110. In other words, the execution screen of the application belonging to the chat category may include a message screen displaying messages that the user sent and received with another user, and a keyboard user interface for inputting a message. In this case, the processor 140 may not transmit the keyboard user interface to the display apparatus 200 and may transmit only the message screen to the display apparatus 200 through the communication interface 110. In this case, the processor 230 may display the message screen received from the electronic apparatus 100 on the display 220. Accordingly, the user may be provided with a larger number of messages through the display 220.

In another example, if the application belongs to the memo category or the map category, the processor 230 may fixedly display the execution screen received from the electronic apparatus 100 on the display 220. Here, fixedly displaying may refer to continuously displaying the execution screen at a fixed position of the display 220.

In another example, if the application belongs to the SNS category, the processor 230 may display the periodically updated execution screen on the display 220. For this, the processor 230 may transmit the category information of the application to the electronic apparatus 100 through the communication interface 210. In this case, the processor 140 may identify that the execution screen transmitted to the display apparatus 200 is generated by the application belonging to the SNS category based on the category information received from the display apparatus 200, updates the execution screen of the SNS application periodically by using posts, comments, images, and the like which are newly added, and transmit the updated execution screen to the display apparatus 100. In this case, the processor 230 may display the execution screen received from the electronic apparatus 100 on the display 220.

In the above examples, the display apparatus 200 is described as identifying the category to which the application belongs by using the information for the name of the application included in the metadata of the application. However, there is no limitation thereto, and the metadata of the application may include the category information of the application, and in this case, the display apparatus 200 may identify the category of the application by using the category information of the application included in the metadata.

In addition, in the above examples, the display apparatus 200 is described as identifying the category of the application and transmitting the category information to the electronic apparatus 100. However, there is no limitation thereto, and the electronic apparatus 100 may identify the category, to which the application to be transmitted to the display apparatus 200 belongs, and transmit the execution screen of the application to the display apparatus 200 based on the identified category.

As described above, according to an embodiment, since the display apparatus 200 displays the execution screen of the application by various methods according to the category to which the application belongs, the user may be provided with a screen optimized according to the attribute of the application.

In embodiments, in a case of displaying the execution screens of the plurality of applications, the processor 230 may adjust a size of an execution screen of at least one application based on the attribute of the execution screen and display the execution screen on the display 220.

Here, the attribute may include a ratio of the width and the height of the execution screen, and the execution screen may be divided into a screen with a width greater than a height (hereinafter, referred to as a landscape screen) and a screen having a height greater than a width (hereinafter, referred to as a portrait screen) according to the attribute.

Specifically, if the execution screens of the plurality of applications are landscape screens, the processor 230 may adjust the width of the at least one execution screen so that the widths of the all execution screens of the plurality of applications become the same.

Figure 11:
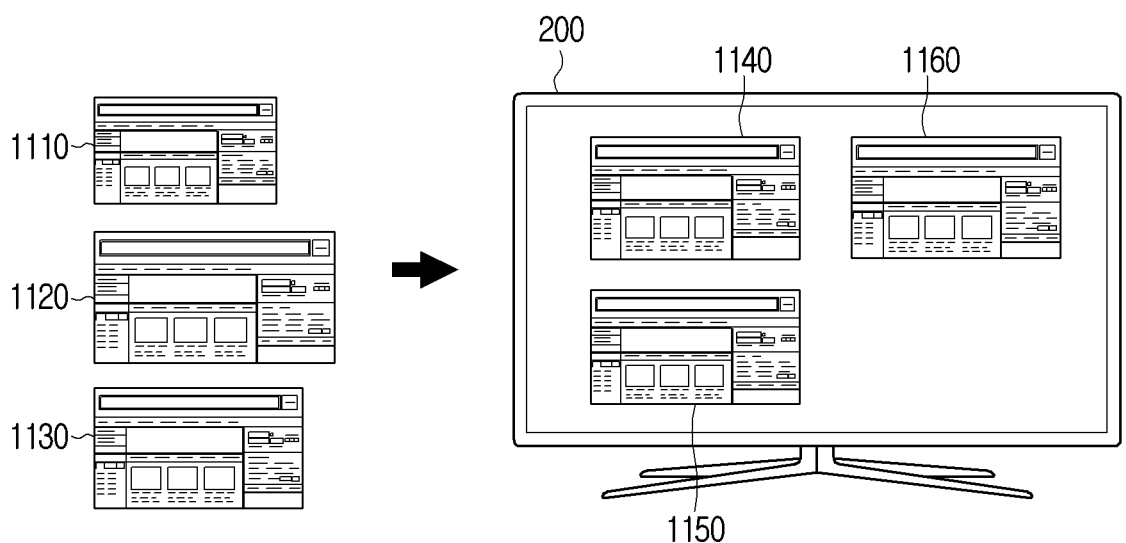
FIG. 11 is a diagram illustrating a method for displaying the execution screens of the plurality of applications by the display apparatus according to an embodiment.

For example, referring to FIG. 11, it is assumed that the display apparatus 200 receives a plurality of execution screens 1110, 1120, and 1130. In this case, the plurality of execution screens 1110, 1120, and 1130 may be the landscape screens and the widths thereof may be different from each other. In this case, the processor 230 may adjust the width of at least one execution screen so as to have the same width as the plurality of execution screens, and display the plurality of execution screens 1140, 1150, and 1160 having the same width on the display 220.

In addition, if the execution screens of the plurality of applications are portrait screens, the processor 230 may adjust the height of the at least one execution screen so that the heights of the execution screens of the plurality of applications are the same.

Figure 12:
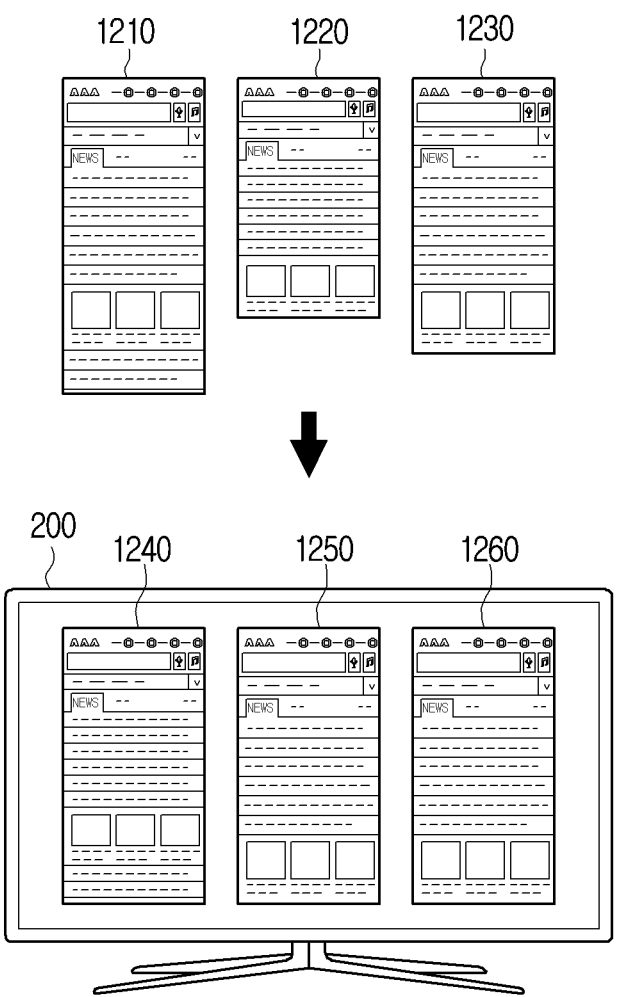
FIG. 12 is a diagram illustrating a method for displaying the execution screens of the plurality of applications by the display apparatus according to an embodiment.

For example, referring to FIG. 12, it is assumed that the display apparatus 200 receives a plurality of execution screens 1210, 1220, and 1230. In this case, the plurality of execution screens 1210, 1220, and 1230 may be portrait screens and the heights thereof may be different from each other. In this case, the processor 230 may adjust the height of at least one execution screen so as that the plurality of execution screens have the same height, and display the plurality of execution screens 1240, 1250, and 1260 having the same height on the display 220.

As described above, according to an embodiment, since the display apparatus 200 provides the plurality of execution screens with the same width or height, the user may be provided with feeling of alignment, although the plurality of electronic apparatuses generate the plurality of execution screens with different sizes.

In embodiments, as described above, the display apparatus 200 may display the plurality of images, and in this case, the arrangement state of each of the plurality of images may be identified based on the arrangement state of the electronic apparatus 100 which displays the images generated based on each application.

Specifically, when the posture of the electronic apparatus 100 is the landscape posture, the processor 140 may generate the execution screen of the application having a width greater than a height and transmit the execution screen to the display apparatus 200 through the communication interface 110, and when the posture of the electronic apparatus 100 is the portrait posture, the processor 140 may generate the execution screen of the application having a height greater than a width and transmit the execution screen to the display apparatus 200 through the communication interface 110.

Accordingly, the display apparatus 200 may receive an execution screen having a ratio of a width and a height identified according to the posture of the electronic apparatus 100. In this case, the processor 230 may display the received execution screen on the display 220.

In the above examples, the operation of managing and controlling the execution screen such as the operation in which the electronic apparatus 100 transmits the execution screen of the application to the display apparatus 200, may be performed by an application (hereinafter, referred to as a mirroring application, stored in the memory 130.

Specifically, the mirroring application may be executed in the background on the electronic apparatus 100. When the execution screen of the application to be transmitted to the display apparatus 200 is generated, the mirroring application may transmit the execution screen to the display apparatus 200 through the communication interface 110.

In addition, the electronic apparatus 100 may perform various operations of managing and controlling the execution screen such as the operation of receiving and displaying the execution screen from the display apparatus 200 and controlling the execution screen displayed on the display apparatus 200 by using the mirroring application, and this will be described below in more detail.

The processor 230 may transmit the plurality of execution screen displayed on the display apparatus 200 to the electronic apparatus 100 through the communication interface 210. In this case, the processor 230 may encode the image frames of each execution screen by using the encoder and transmit the encoded image frames to the electronic apparatus 100 through the Wi-Fi socket. In this case, for the encoding, an encoding method such as H.264 encoding may be used, for example. In addition, the processor 230 may transmit the metadata of the application for providing each of the plurality of execution screens to the electronic apparatus 100.

Accordingly, when the plurality of images displayed on the display apparatus 200 are received from the display apparatus 200 through the communication interface 110, the processor 140 may display the plurality of received images on the display 120. In this case, when the encoded image frames are received from the display apparatus 200 through the Wi-Fi socket, the processor 140 may decode the received image frames by using the decoder to obtain the image frames, and display the image frames on the display 120. In this case, for the decoding, a decoding method such as H.264 decoding may be used, for example.

Here, the plurality of images may be images may be generated based on the plurality of applications of the plurality of electronic apparatuses and transmitted to the display apparatus 200. In other words, the display apparatus 200 may receive and display the execution screen of application generated by each of other electronic apparatuses, in addition to the electronic apparatus 100, and transmit this to the electronic apparatus 100.

For this, the processor 140 may display the execution screen of the mirroring application executed in the background on the display 120 based on the user command. In this case, the execution screen of the mirroring application may include the plurality of execution screens received from the display apparatus 200.

Here, the user command may be a user command for selecting an icon corresponding to the mirroring application displayed on the home screen or a user command for selecting an execution screen of the mirroring application among the execution screens of the applications being executed in the background, but there is no limitation thereto.

Next, when a third user command for one image among the plurality of images is input, the processor 140 may transmit the third user command to the display apparatus 200 through the communication interface 110.

Here, the third user command may include various user commands capable of being input to the application for controlling the application. For example, the third user command may include a user command for cropping an execution screen, a user command for adjusting a size of an execution screen, a user command for scrolling an execution screen, and the like.

In this case, the processor 140 may transmit the third user command and information about the application for which the third user command is input (e.g., information on a name of the application) to the display apparatus 200 through the communication interface 110.

When the third user command and the information about the application for which the third user command is input are received from the electronic apparatus 100 through the communication interface 210, the processor 230 may identify the application for which the third user command is input based on the information about the application, and transmit the third user command to the electronic apparatus which transmits the execution screen of the application through the communication interface 210. In this case, the processor 230 may transmit the third user command and the information about the application for which the third user command is input to the electronic apparatus through the communication interface 210.

In this case, when the third user command and the information about the application for which the third user command is input are received from the display apparatus 200, the electronic apparatus may identify the application for which the third user command is input based on the information about the application, input the third user command to the application, generate the execution screen of the application according to the third user command, and transmit this to the display apparatus 200.

Then, the processor 230 may display the execution screen of the application received from the electronic apparatus on the display 220. The processor 230 may transmit the execution screen of the application received from the electronic apparatus to the electronic apparatus 100 through the communication interface 210. In this case, the processor 140 may display the execution screen received from the display apparatus 200 on the display 120 by using the mirroring application.

Figure 13A:
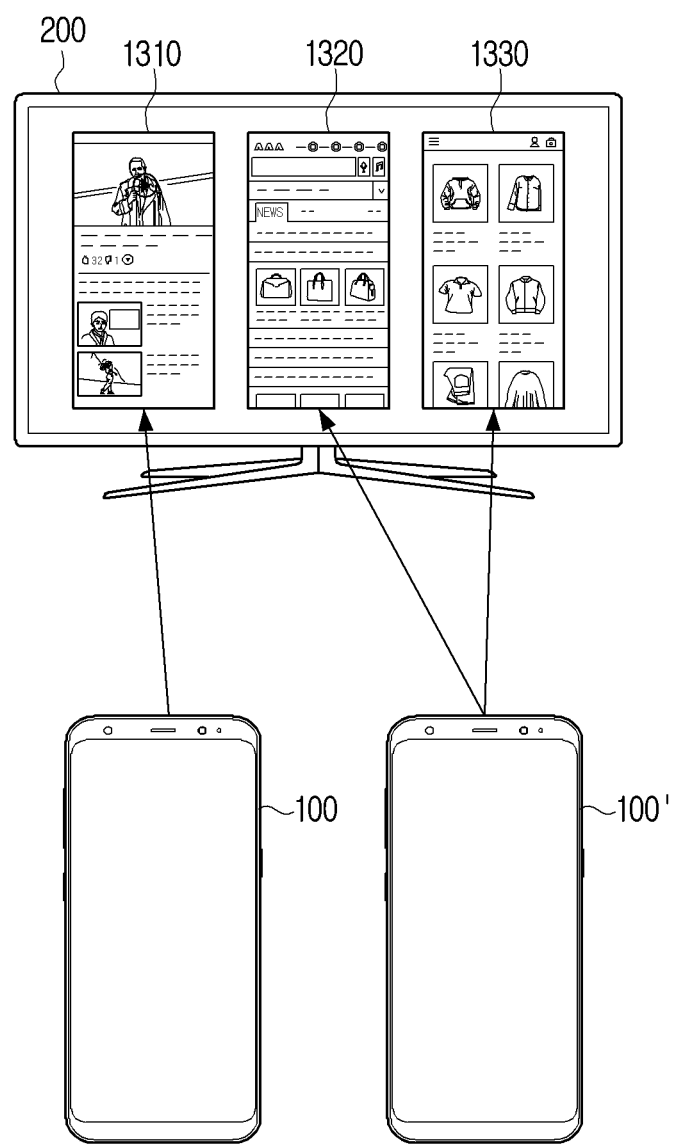
FIG. 13A is a diagram illustrating a method for controlling the execution screen of the application displayed on the display apparatus through the electronic apparatus according to an embodiment.

For example, referring to FIG. 13A, the display apparatus 200 may display an execution screen 1310 received from the electronic apparatus 100 and execution screens 1320 and 1330 received from an electronic apparatus 100'.

Figure 13B:
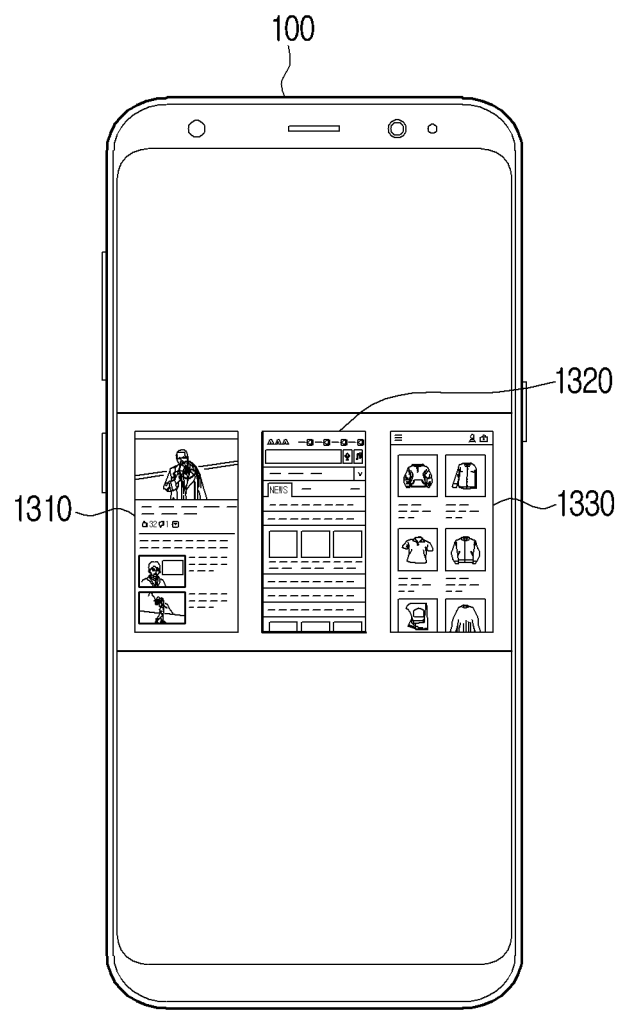
FIG. 13B is a diagram illustrating a method for controlling the execution screen of the application displayed on the display apparatus through the electronic apparatus according to an embodiment.

Referring to FIG. 13B, the electronic apparatus 100 may display the execution screens 1310, 1320, and 1330 received from the display apparatus 200. In this case, the user may select the execution screen 1320 among the plurality of execution screens 1310, 1320, and 1330 and input a user command for cropping some region of the selected execution screen 1320 to the electronic apparatus 100.

The electronic apparatus 100 may transmit the input user command to the display apparatus 200 and the display apparatus 200 may transmit the user command received from the electronic apparatus 100 to the electronic apparatus 100'. The electronic apparatus 100' may cut out some region from the execution screen based on the user command received from the display apparatus 200 and transmit the execution screen including the remaining region to the display apparatus 200.

Figure 13C:
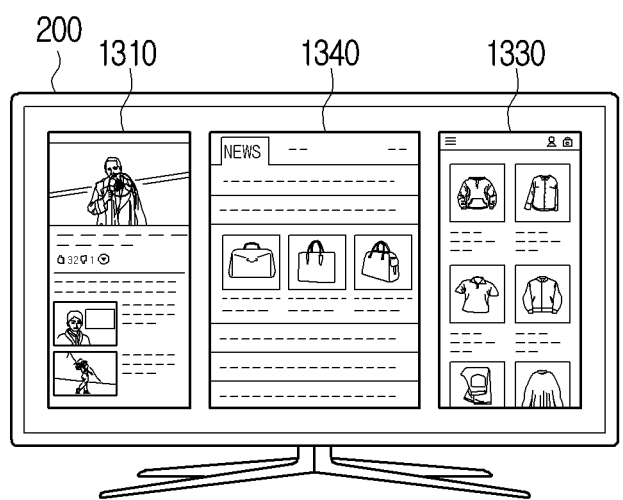
FIG. 13C is a diagram illustrating a method for controlling the execution screen of the application displayed on the display apparatus through the electronic apparatus according to an embodiment.

Accordingly, referring to FIG. 13C, the display apparatus 200 may display an execution screen 1340 including the remaining region received from the electronic apparatus 100'.

Figure 14A:
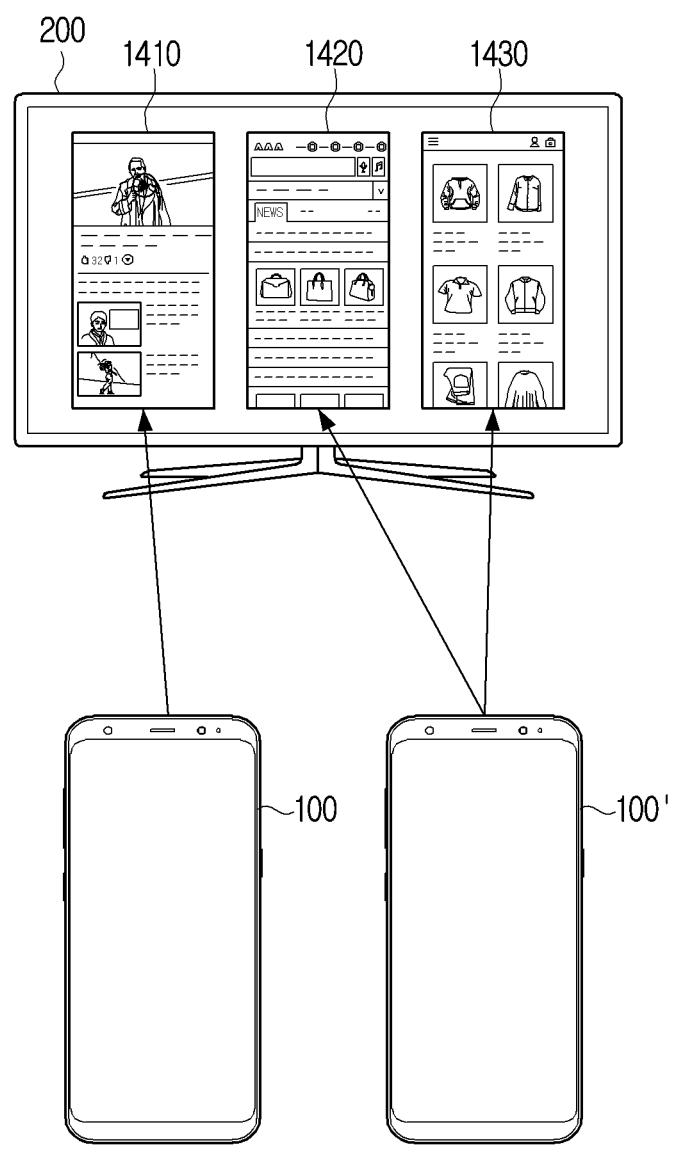
FIG. 14A is a diagram illustrating a method for controlling the execution screen of the application displayed on the display apparatus through the electronic apparatus according to an embodiment.

In another example, referring to FIG. 14A, the display apparatus 200 may display an execution screen 1410 received from the electronic apparatus 100 and execution screens 1420 and 1430 received from the electronic apparatus 100'.

Figure 14B:
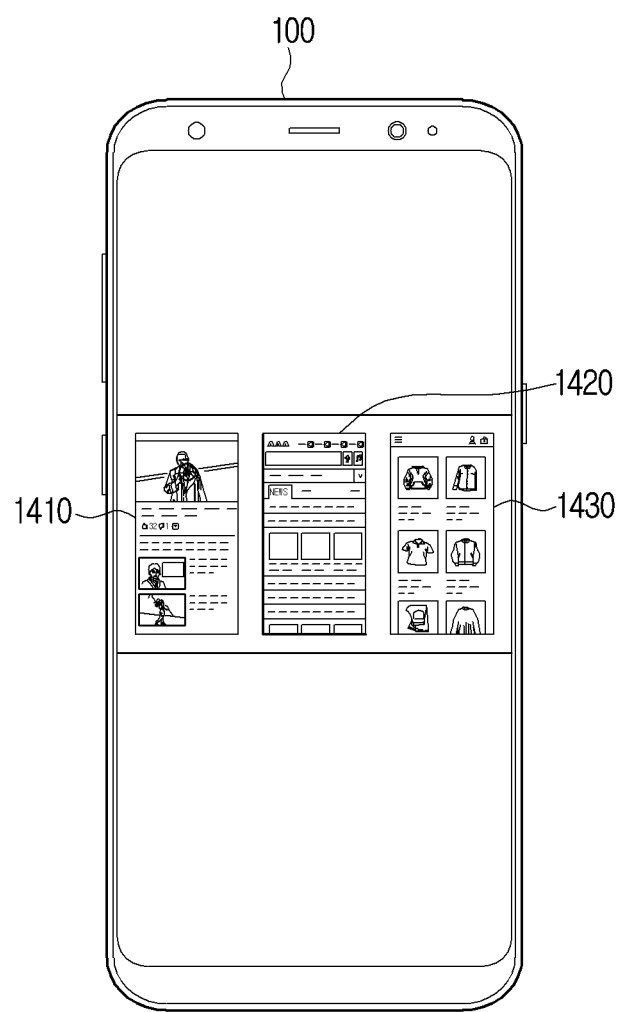
FIG. 14B is a diagram illustrating a method for controlling the execution screen of the application displayed on the display apparatus through the electronic apparatus according to an embodiment.

Referring to FIG. 14B, the electronic apparatus 100 may display the plurality of execution screens 1410, 1420, and 1430 received from the display apparatus 200. Here, the user may select the execution screen 1420 among the plurality of execution screens 1410, 1420, and 1430, and input a user command for enlarging the selected execution screen 1420 to the electronic apparatus 100.

Then, the electronic apparatus 100 may transmit the input user command to the display apparatus 200 and the display apparatus 200 may transmit the user command received from the electronic apparatus 100 to the electronic apparatus 100'. The electronic apparatus 100' may enlarge the execution screen based on the user command received from the display apparatus 200 and transmit the enlarged execution screen to the display apparatus 200.

Figure 14C:
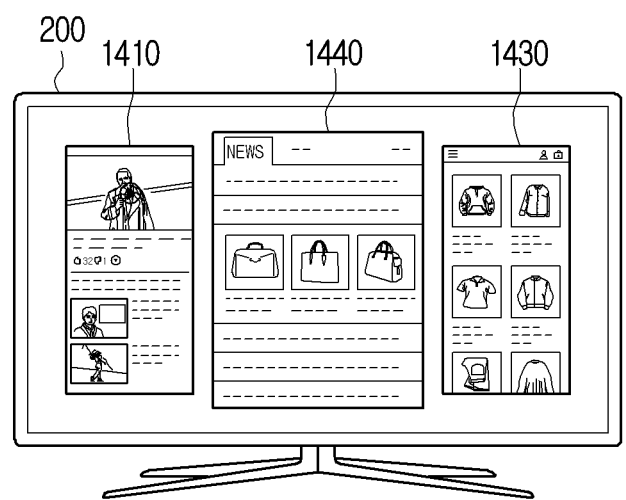
FIG. 14C is a diagram illustrating a method for controlling the execution screen of the application displayed on the display apparatus through the electronic apparatus according to an embodiment.

Accordingly, referring to FIG. 14C, the display apparatus 200 may display the enlarged execution screen 1440 received from the electronic apparatus 100'.

Figure 15A:
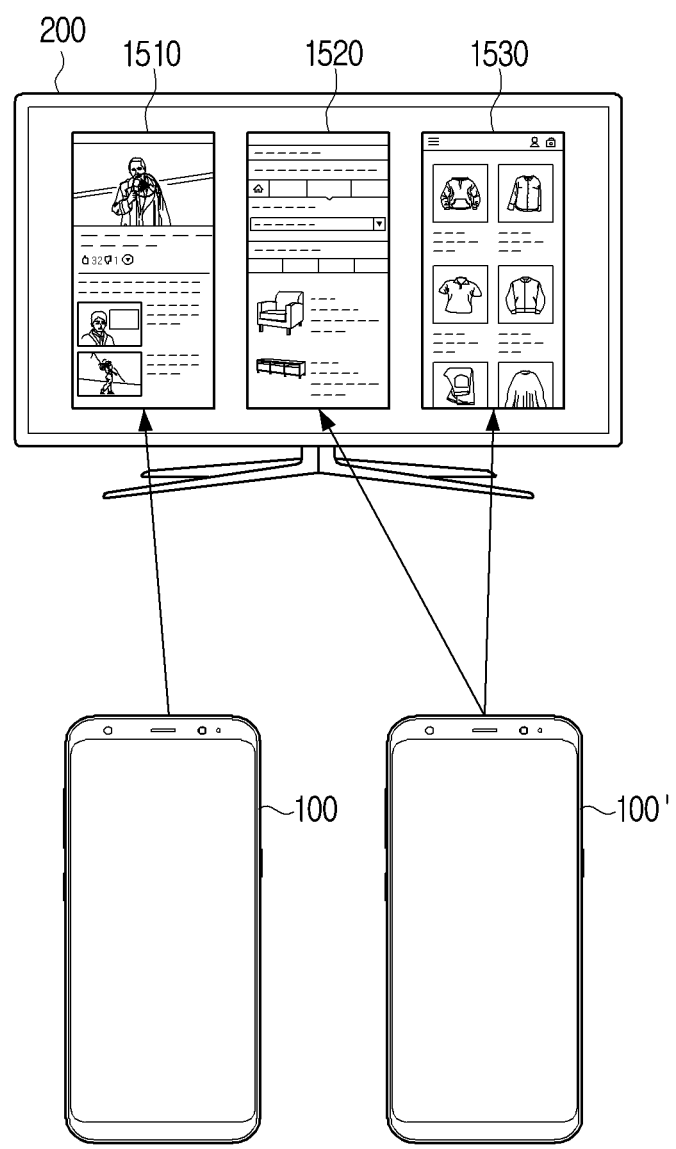
FIG. 15A is a diagram illustrating a method for controlling the execution screen of the application displayed on the display apparatus through the electronic apparatus according to an embodiment.

In another example, referring to FIG. 15A, the display apparatus 200 may display an execution screen 1510 received from the electronic apparatus 100 and execution screens 1520 and 1530 received from the electronic apparatus 100'.

Figure 15B:
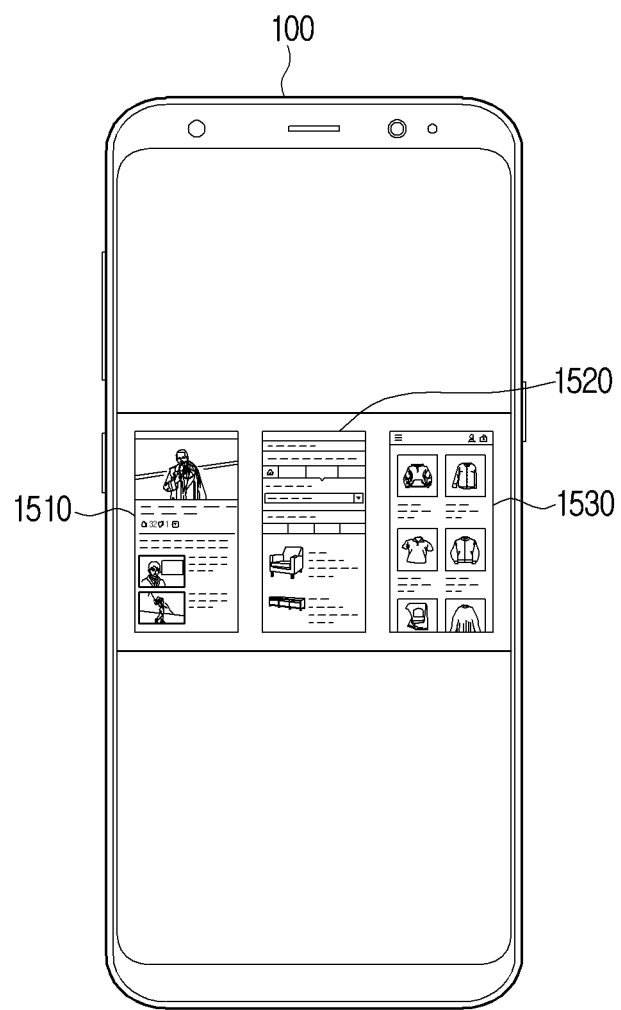
FIG. 15B is a diagram illustrating a method for controlling the execution screen of the application displayed on the display apparatus through the electronic apparatus according to an embodiment.

Referring to FIG. 15B, the electronic apparatus 100 may display the plurality of execution screens 1510, 1520, and 1530 received from the display apparatus 200. Here, the user may select the execution screen 1520 among the plurality of execution screens 1510, 1520, and 1530, and input a user command for scrolling the selected execution screen 1520 to the electronic apparatus 100.

In this case, the electronic apparatus 100 may transmit the input user command to the display apparatus 200 and the display apparatus 200 may transmit the user command received from the electronic apparatus 100 to the electronic apparatus 100'. The electronic apparatus 100' may scroll the execution screen based on the user command received from the display apparatus 200 and transmit the scrolled execution screen to the display apparatus 200.

Figure 15C:
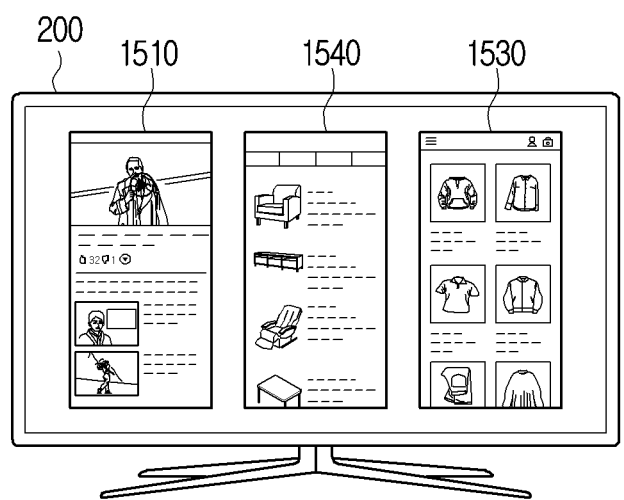
FIG. 15C is a diagram illustrating a method for controlling the execution screen of the application displayed on the display apparatus through the electronic apparatus according to an embodiment.

Accordingly, referring to FIG. 15C, the display apparatus 200 may display the scrolled execution screen 1540 received from the electronic apparatus 100'.

As described above, according to an embodiment, although it is not the execution screen of the application transmitted to the display apparatus 200 through the electronic apparatus 100, the user may control the execution screen of another electronic apparatus displayed on the display apparatus 200 by using the electronic apparatus 100, thereby enhancing the user's convenience.

In embodiments, the electronic apparatus 100 may search for the execution screen displayed on the display apparatus 200 by using the mirroring application, and this will be described below in more detail.

When a text is input to a search box included in the execution screen of the mirroring application, the processor 140 may transmit the input text to the display apparatus 200 through the communication interface 110.

In this case, the processor 230 may search for a plurality of images displayed on the display 220 based on the text received from the electronic apparatus 100 and display a search result on the display 220.

Specifically, the processor 230 may recognize the text from each of the plurality of execution screens displayed on the display 220 or recognize a color of an image or a color or a shape of an object included in the image included in each execution screen, and identify a text or an image matching to the text received from the electronic apparatus 100 on the plurality of execution screens displayed on the display 220.

The processor 230 may display a part matching the text received from the electronic apparatus 100 as differentiated or discriminated from the other part on the plurality of execution screens displayed on the display 220. For example, the processor 230 may highlight and display the parts matching to the text received from the electronic apparatus 100 on the plurality of execution screens displayed on the display 220.

Figure 16A:
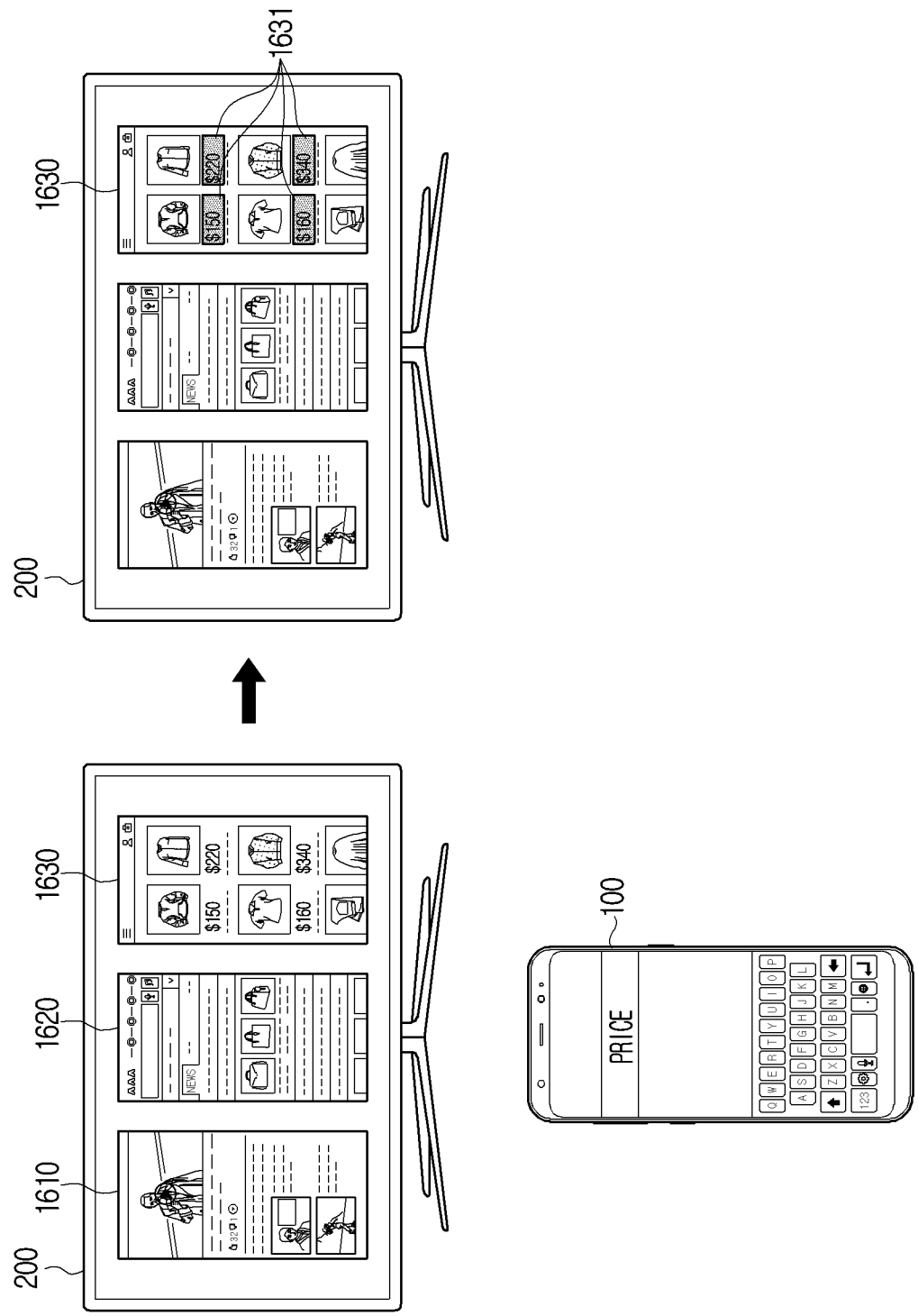
FIG. 16A is a diagram illustrating a method for performing search for the execution screen of the application displayed on the display apparatus through the electronic apparatus according to an embodiment.

For example, referring to FIG. 16A, the display apparatus 200 may display a plurality of execution screens 1610, 1620, and 1630. In this case, if "price" is input to the search box, the electronic apparatus 100 may transmit the input "price" as a search word to the display apparatus 200. In this case, the display apparatus 200 may analyze the plurality of execution screens 1610, 1620, and 1630, identify whether there is a text indicating the price on the plurality of execution screens 1610, 1620, and 1630, and display the identified texts on the execution screen 1630, differentiated or distinguished by highlight 1631.

Figure 16B:
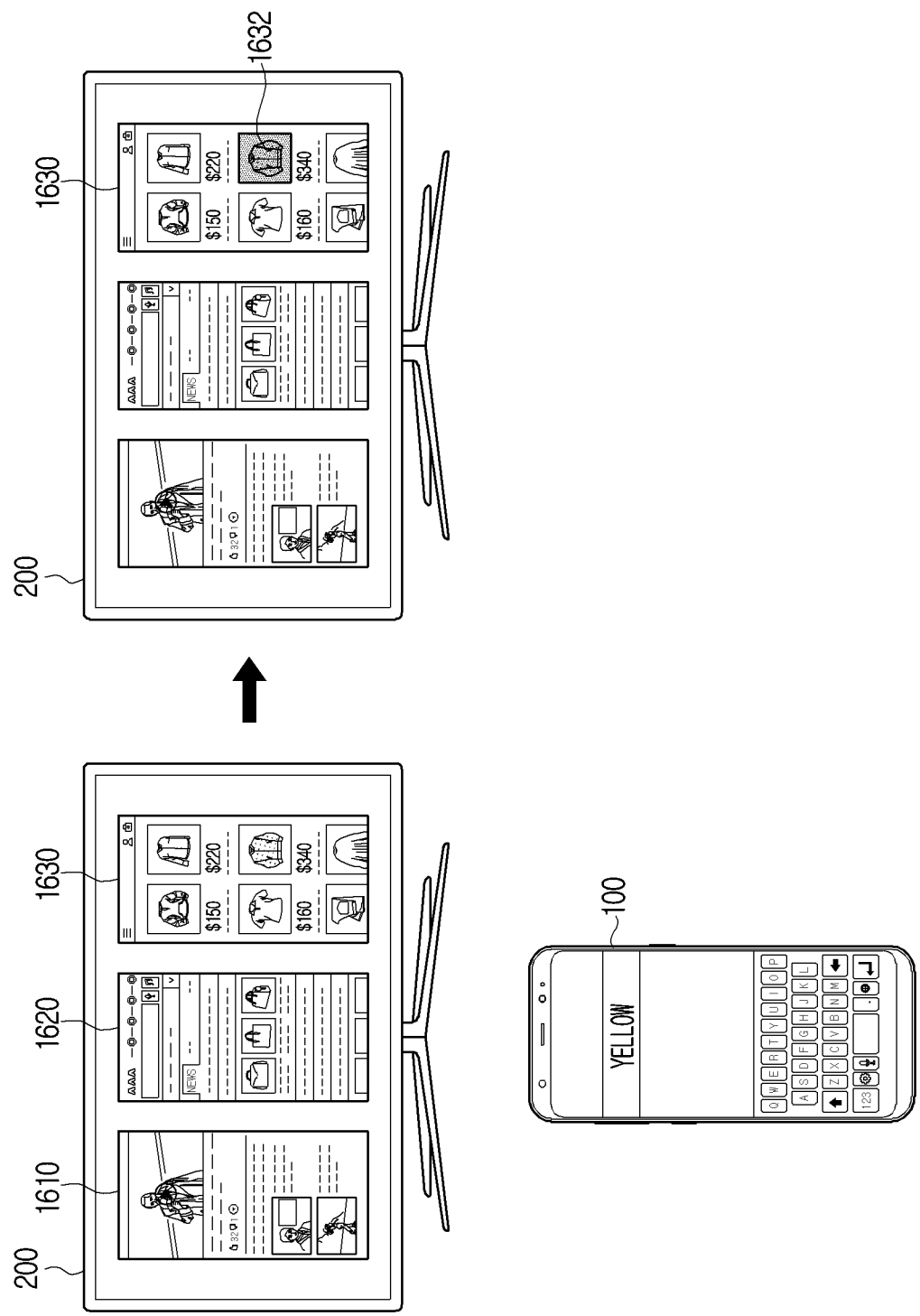
FIG. 16B is a diagram illustrating a method for performing search for the execution screen of the application displayed on the display apparatus through the electronic apparatus according to an embodiment.

In another example, referring to FIG. 16B, the display apparatus 200 may display the plurality of execution screens 1610, 1620, and 1630. In this case, if "yellow" is input to the search box, the electronic apparatus 100 may transmit the input "yellow" as a search word to the display apparatus 200. In this case, the display apparatus 200 may analyze the plurality of execution screens 1610, 1620, and 1630, identify whether there is a yellow image on the plurality of execution screens 1610, 1620, and 1630, and display a region including the identified yellow image on the execution screen 1630, differentiated or distinguished by highlight 1632.

As described above, according to an embodiment, the user may search for the execution screen of another electronic apparatus displayed on the display apparatus 200 by using the electronic apparatus 100, even the execution screen of the application is not transmitted through the electronic apparatus 100 to the display apparatus 200, thereby enhancing the user's convenience.

In embodiments, in a case of displaying the plurality of execution screens, the display apparatus 200 may display the plurality of execution screens in various layouts, examples of which will be described below in more detail.

As described above, the processor 230 may display the plurality of execution screens received from at least one electronic apparatus on the display 220.

In this case, the processor 230 may display a pre-identified number of execution screens among the plurality of execution screens on the display 220. Here, the pre-identified number may be a maximum number of the execution screens displayed on the display 220.

When a user command for scrolling the execution screen displayed on the display 220 is input, the processor 230 may scroll the plurality of execution screens displayed on the display 220 and display another execution screen not displayed on the display 220.

Here, the user command may be input to at least one electronic apparatus. For example, when a user command, for example, touch input in one direction (e.g., flicking, swiping, or dragging user command, or the like, but there is no limitation thereto) for scrolling the execution screen displayed on the display 220 is input, the processor 140 may transmit the input user command to the display apparatus 200 through the communication interface 110.

For example, it is assumed that the display apparatus 200 set to display four execution screens receives five execution screens from at least one electronic apparatus including the electronic apparatus 100.

Figure 17A:
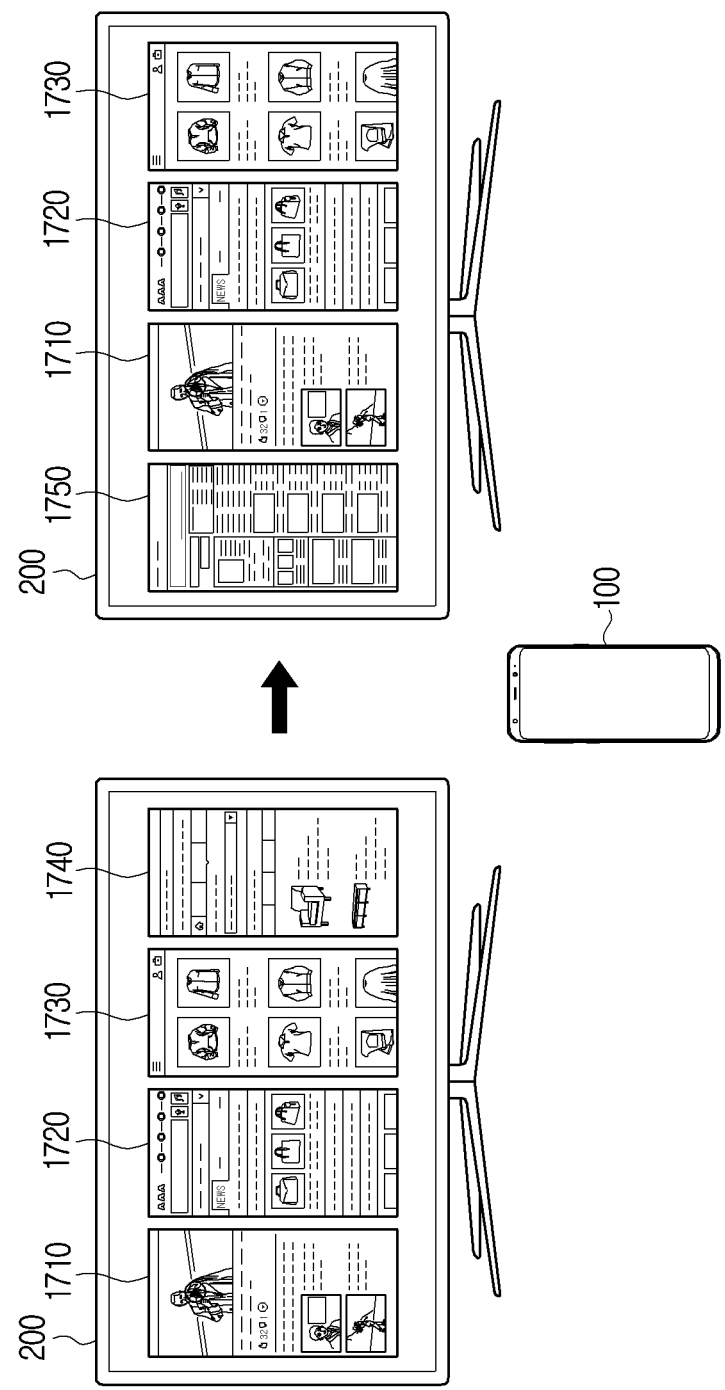
FIG. 17A is a diagram illustrating a number of execution screens displayed on the display apparatus according to an embodiment.

In this case, referring to FIG. 17A, the display apparatus 200 may display four execution screens 1710, 1720, 1730, and 1740 among the five received execution screens. In this case, when a user command for scrolling the execution screen displayed on the display 220 is input, the display apparatus 200 may scroll the plurality of execution screens displayed on the display 220, remove one execution screen 1740 among the four execution screens 1710, 1720, 1730, and 1740, and display a new execution screen 1750.

In embodiments, referring to FIG. 17A, the display apparatus 200 is described as displaying four execution screens at most, but there is no limitation thereto, and referring to the examples shown in FIG. 17B, the display apparatus 200 may be set to display three, four, and five execution screens at maximum, respectively. In addition, the display apparatus may be set to display a larger number thereof. In this case, the remaining execution screen other than the execution screens displayed on the display 220 may be displayed based on the user command for scrolling the execution screen. In embodiments, the number of execution screens displayed by the display apparatus 200 at maximum may be set based on the user command.

In embodiments, in a state where the plurality of images are displayed on the display 220, when the image generated based on the application is received from the electronic apparatus 100 through the communication interface 210, the processor 230 may remove one of the plurality of images displayed on the display 220 and display the received image on the display 220.

In other words, as described above, the processor 230 may display the pre-identified number of execution screens on the display 220. Here, in a state where the pre-identified number of execution screens are displayed on the display 220, when the execution screen of the application is received from the electronic apparatus 100, the processor 230 may remove one of the plurality of execution screens displayed on the display 220 and display the execution screen of the application received from the electronic apparatus 100. In this case, the removed execution screen may be displayed on the display 220 based on the user command for scrolling the execution screen displayed on the display 220.

In embodiments, the processor 230 may fixedly display at least one execution screen among the plurality of execution screens displayed on the display 220. As described above, if the application belongs to the memo category or the map category, the processor 230 may continuously display the execution screen of the corresponding application at a fixed position of the display 220.

For example, when the user command for scrolling the execution screen displayed on the display 220 is input or a new execution screen is received from the electronic apparatus, the processor 230 may hold the fixedly displayed execution screen as it is among the plurality of execution screens displayed on the display 220, scroll the other execution screens, and display the other execution screens on the display 220.

Figure 18:
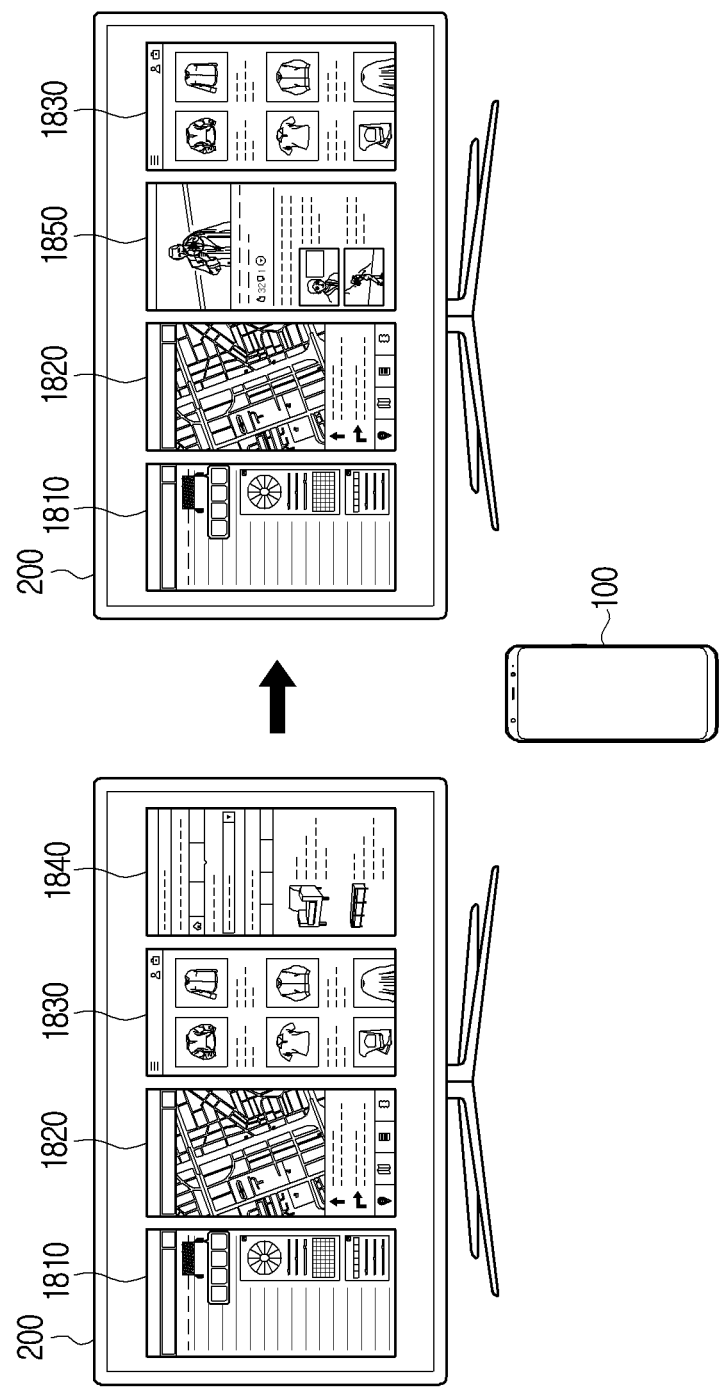
FIG. 18 is a diagram illustrating a method for displaying the execution screen according to the number of execution screens displayed on the display apparatus according to an embodiment.

For example, referring to FIG. 18, the display apparatus 200 set to display four execution screens at most may display four execution screens 1810, 1820, 1830, and 1840. Here, it is assumed that the execution screens 1810 and 1820 among the execution screens 1810, 1820, 1830, and 1840 are fixedly displayed execution screens.

In this case, when the display apparatus 200 receives the execution screen from the electronic apparatus 100, the display apparatus 200 may hold the execution screens 1810 and 1820 as they are and scroll the remaining execution screens 1830 and 1840 to remove the execution screen 1840, and display the execution screen 1830 and an execution screen 1850 received from the electronic apparatus 100, along with the execution screens 1810 and 1820.

In embodiments, when displaying the plurality of execution screens, the display apparatus 200 may display the plurality of execution screens in consideration of the locations of the plurality of electronic apparatuses which have transmitted the execution screens to the display apparatus 200, an example of which will be described below in more detail.

When the plurality of images are received from the plurality of electronic apparatuses, the processor 230 may identify positions of the plurality of images displayed on the display 220 based on the direction in which the plurality of electronic apparatuses are located based on the display apparatus 200, and display the plurality of images on the display 220 based on the identified positions. In embodiments, the direction in which the plurality of electronic apparatuses are located based on the display apparatus 200 may be a location of the plurality of electronic apparatuses with respect to, or relative to, the display apparatus 200.

For this, the processor 230 may identify the direction in which the plurality of electronic apparatuses are located based on the display apparatus 200 by using various methods. For example, the processor 230 may identify the direction in which the plurality of electronic apparatuses are located based on the display apparatus 200 through Time of Arrival (ToA), Time Difference of Arrival (TDoA), Angle of Arrival (AoA), or Angle of Departure (AoD) by using a communication method such as Bluetooth, ultra-wideband (UWB), or Wi-Fi.

Accordingly, the processor 230 may identify relative locations of the plurality of electronic apparatuses based on the display apparatus 200. For example, the processor 230 may identify which apparatus is located on the left or right based on the display apparatus 200 among the plurality of electronic apparatuses.

The processor 230 may identify positions of the plurality of execution screens received from the plurality of electronic apparatuses displayed on the display 220 based on the relative locations of the plurality of electronic apparatuses.

Specifically, the processor 230 may identify that at least one execution screen received from the electronic apparatus located relatively on the left of the display apparatus 200 is positioned relatively on the left on the display 220, and at least one execution screen received from the electronic apparatus located relatively on the right of the display apparatus 200 is positioned relatively on the right on the display 220.

The processor 230 may display the plurality of execution screens received from the plurality of electronic apparatuses based on the identified position on the display 220.

Figure 19:
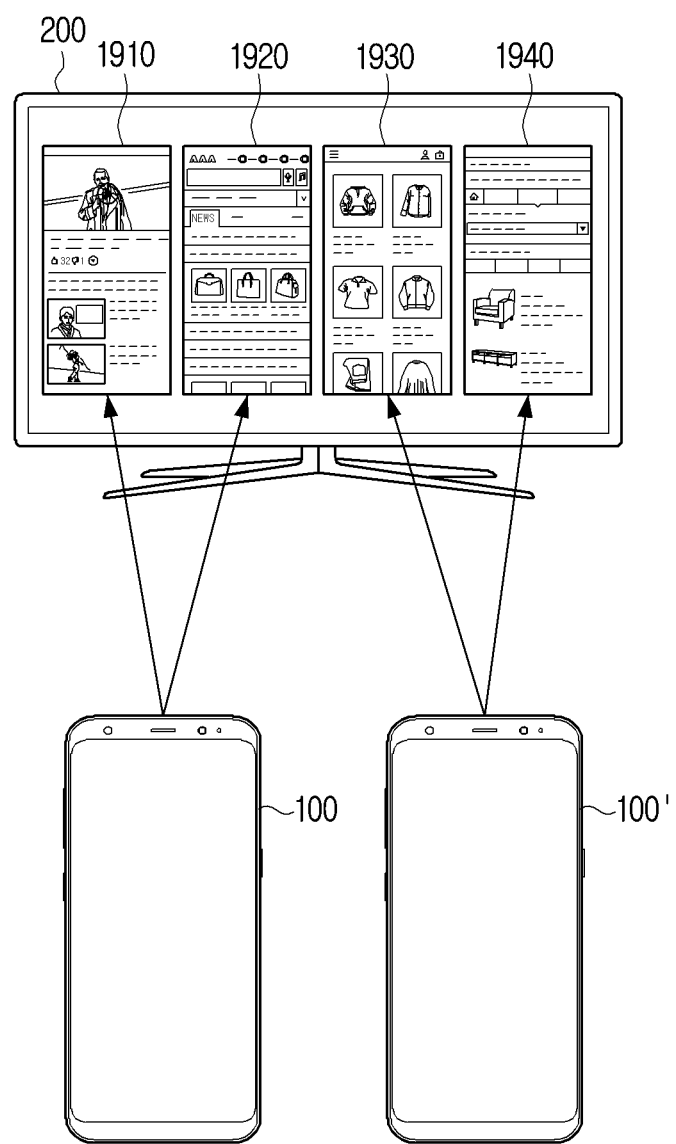
FIG. 19 is a diagram illustrating a method for displaying the execution screen of the application by the display apparatus according to a location of the electronic apparatus according to an embodiment.

For example, referring to FIG. 19, the display apparatus 200 may receive a plurality of execution screens 1910 and 1920 from the electronic apparatus 100 and receive a plurality of execution screens 1930 and 1940 from the electronic apparatus 100'.

In this case, the display apparatus 200 may display the plurality of executions screens 1910 and 1920 received from the electronic apparatus 100 on the right of the plurality of execution screens 1930 and 1940 received from the electronic apparatus 100', since the electronic apparatus 100 is located relatively on the right of the electronic apparatus 100' based on the display apparatus 200.

In embodiments, in a case of displaying the plurality of execution screens, the display apparatus 200 may display the plurality of execution screens in consideration of distances and locations of the plurality of electronic apparatuses that have transmitted the execution screens to the display apparatus 200, an example of which will be described hereinafter in more detail.

In a case where the plurality of images are received from the plurality of electronic apparatuses, the processor 230 may identify the number of images displayed on the display 220 based on the distance between the display apparatus 200 and the plurality of electronic apparatuses, and display the identified number of images among the plurality of images on the display 220. For example, the processor 230 may identify the distance between the display apparatus 200 and the plurality of electronic apparatuses by using the UWB technology.

In a case where the plurality of electronic apparatuses are located in a region within a first threshold distance from the display apparatus 200, the processor 230 may determine that a first number of execution screens should be displayed on the display 220. In addition, in a case where the plurality of electronic apparatuses are located in a region between the first threshold distance and a second threshold distance from the display apparatus 200, the processor 230 may determine that a second number of execution screens should be displayed on the display 220. In addition, in a case where the plurality of electronic apparatuses are located in a region equal to or greater than the second threshold distance from the display apparatus 200, the processor 230 may determine that a third number of execution screens should be displayed on the display 220.

Here, the second threshold distance may be greater than the first threshold distance. For example, the first and second threshold distances may be pre-identified at the stage of manufacturing and may be set or changed by the user. The first number is greater than the second number and the second number is greater than the third number. For example, the first to third numbers may be pre-identified at the stage of manufacturing and may be set or changed by the user.

Figure 20A:
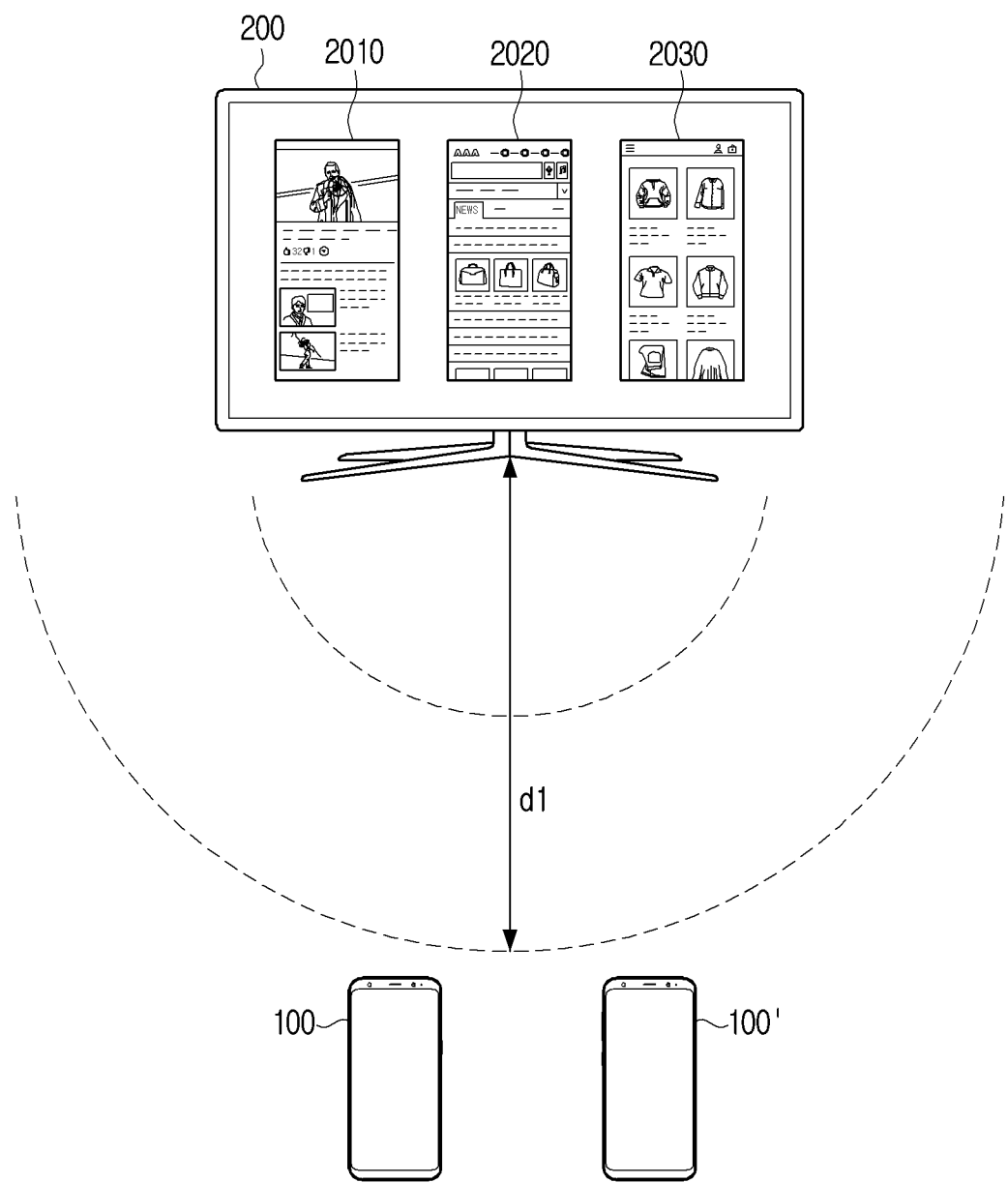
FIG. 20A is a diagram illustrating a method for displaying the execution screen of the application by the display apparatus according to a distance between the electronic apparatus and the display apparatus according to an embodiment.
Figure 20B:
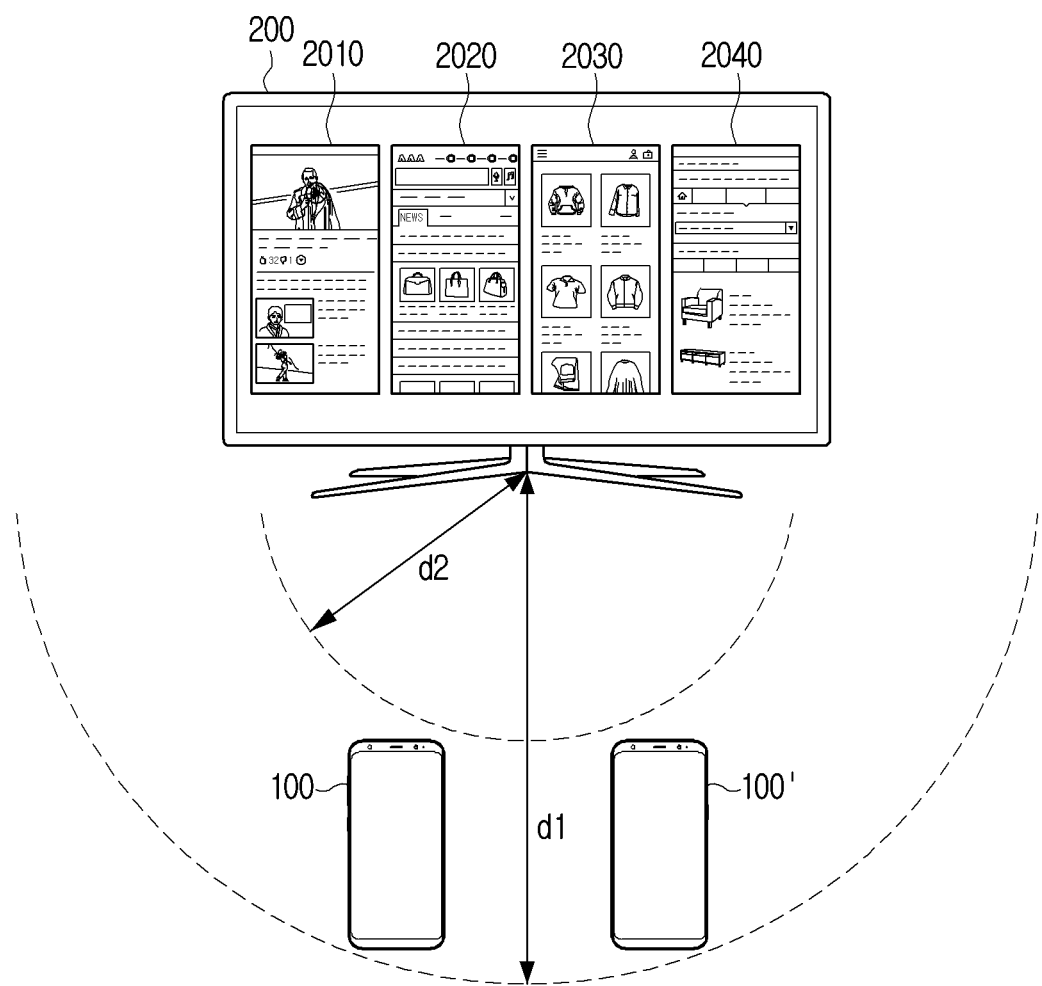
FIG. 20B is a diagram illustrating a method for displaying the execution screen of the application by the display apparatus according to a distance between the electronic apparatus and the display apparatus according to an embodiment.
Figure 20C:
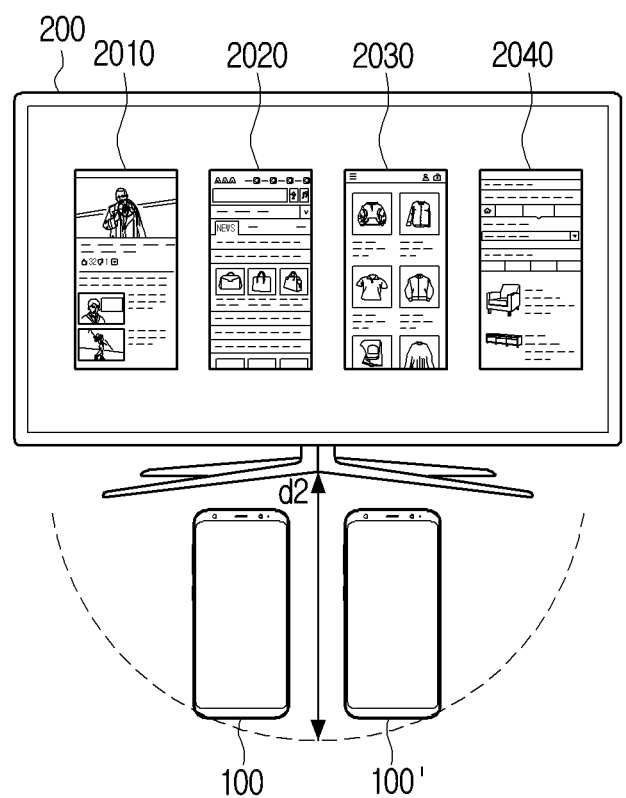
FIG. 20C is a diagram illustrating a method for displaying the execution screen of the application by the display apparatus according to a distance between the electronic apparatus and the display apparatus according to an embodiment.

For example, referring to FIGS. 20A to 20C, it is assumed that the display apparatus 200 receives a plurality of executions 2010 and 2020 from the electronic apparatus 100 and receives a plurality of execution screens 2030 and 2040 from the electronic apparatus 100'.

In this case, referring to FIG. 20A, in a case where the electronic apparatuses 100 and 100' are located in a region equal to or greater than the second threshold distance $d^1$, the display apparatus 200 may determine that the three execution screens should be displayed on the display 220 at maximum and display the three execution screens 2010, 2020, and 2030 among the four received execution screens 2010, 2020, 2030, and 2040.

In addition, referring to FIG. 20B, in a case where the electronic apparatuses 100 and 100' are located in a region between the first threshold distance $d_2$ and the second threshold distance $d_1$, the display apparatus 200 may determine that the four execution screens at maximum should be displayed on the display 220 and display the four received execution screens 2010, 2020, and 2030, and 2040.

In addition, referring to FIG. 20C, in a case where the electronic apparatuses 100 and 100' are located within the first threshold distance $d_2$, the display apparatus 200 may determine that the five execution screens at maximum should be displayed on the display 220. In this case, the display apparatus 200 may display the four execution screens 2010, 2020, 2030, and 2040 in terms of receiving the four execution screens 2010, 2020, 2030, and 2040.

As described above, the processor 230 may determine the maximum number of execution screens displayed on the display 220 based on the distance between the display apparatus 200 and the plurality of electronic apparatuses.

Even in this case, the processor 230 may display the plurality of execution screens in consideration of the locations of the plurality of electronic apparatuses that have transmitted the execution screens to the display apparatus 200. In other words, the processor 230 may identify the positions of the plurality of images displayed on the display 220 based on the directions of the plurality of electronic apparatuses located based on the display apparatus 200, and display the number of images identified based on the identified locations on the display 220.

For example, referring to FIGS. 20A to 20C, since the electronic apparatus 100 is located relatively on the right of the electronic apparatus 100' based on the display apparatus 200, the display apparatus 200 may display the plurality of execution screens 2010 and 2020 received from the electronic apparatus 100 on the right of the plurality of execution screens 2030 and 2040 received from the electronic apparatus 100'.

In embodiments, the display apparatus 200 may receive a new execution screen from the electronic apparatus 100 or 100'. In this case, the processor 230 may display the execution screen received from the electronic apparatus 100 or 100' on the display 220 based on the maximum number of execution screens displayed on the display 220 and the number of execution screens displayed on the display 220.

Figure 20D:
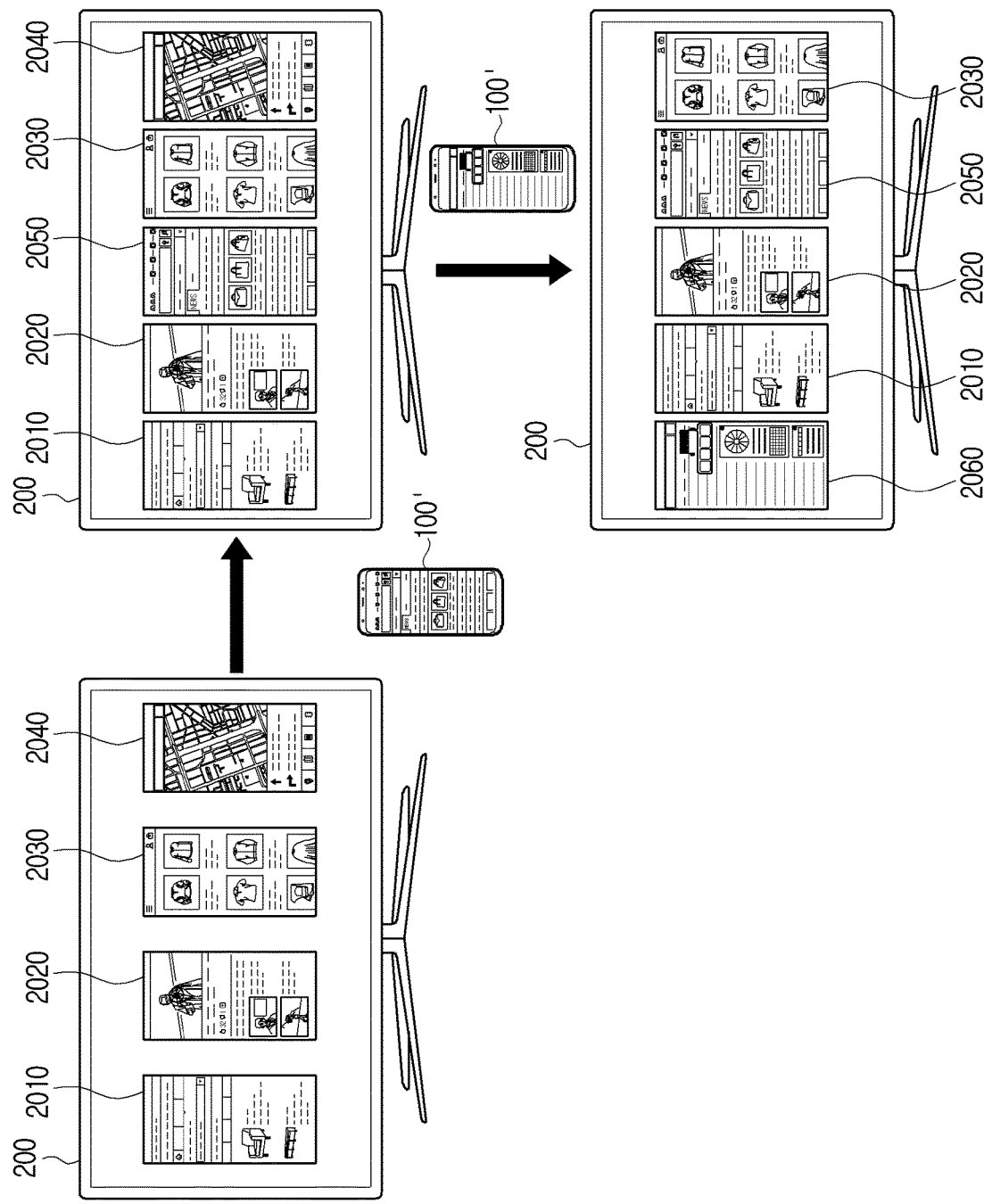
FIG. 20D is a diagram illustrating a method for displaying the execution screen of the application by the display apparatus according to a distance between the electronic apparatus and the display apparatus according to an embodiment.

For example, referring to FIG. 20D, it is assumed that it is identified that five execution screens at maximum are displayed on the display 220 and the display apparatus 200 displays four execution screens 2010, 2020, 2030, and 2040 received from the electronic apparatuses 100 and 100'.

In this case, since the electronic apparatus 100 is located relatively on the right of the electronic apparatus 100' based on the display apparatus 200, the plurality of execution screens 2010 and 2020 received from the electronic apparatus 100 may be displayed on the right of the plurality of execution screens 2030 and 2040 received from the electronic apparatus 100'.

Here, it is assumed that the display apparatus 200 receives the execution screen from the electronic apparatus 100'. In this case, since a number of execution screens smaller than the maximum number are displayed on the display 220, the processor 230 may display an execution screen 2050 received from the electronic apparatus 100' on the display 220. In this case, the processor 230 may display the execution screen 2050 on the right of the execution screens 2030 and 2040 received from the electronic apparatus 100'.

After that, it is assumed that the display apparatus 200 receives the execution screen from the electronic apparatus 100.

In this case, since the maximum number of execution screens are displayed on the display 220, the processor 230 may remove one execution screen by scrolling the plurality of execution screens displayed on the display 220 and display an execution screen 2060 received from the electronic apparatus 100 on the display 220. Rather than scrolling all execution screens displayed on the display 220, the processor 230 may remove one execution screen 2040 by scrolling the execution screens 2030, 2040, and 2050 received from the electronic apparatus 100' among the plurality of execution screens displayed on the display 220, and display the execution screen 2060 on the right of the execution screens 2010 and 2020 received from the electronic apparatus 100.

As described above, according to an embodiment, since the display apparatus 200 displays the execution screens in consideration of at least one of location of the user and the distance from the user, the plurality of users are able to more simply confirm the execution screen transmitted by themselves.

Figure 21:
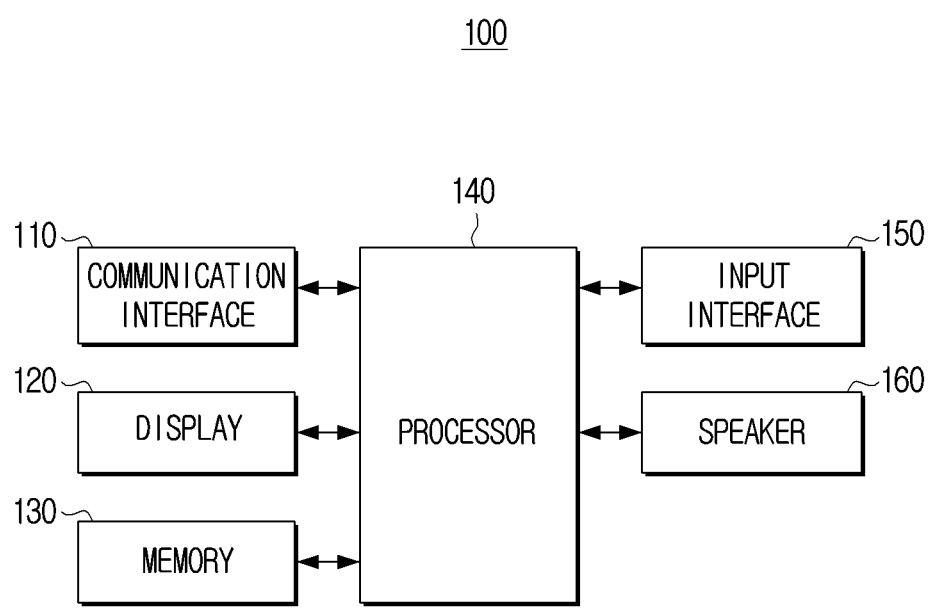
FIG. 21 is a block diagram illustrating a specific configuration of the electronic apparatus according to an embodiment.

FIG. 21 is a block diagram illustrating a specific configuration of the electronic apparatus according to an embodiment.

Referring to FIG. 21, the electronic apparatus 100 may further include an input interface 150 and a speaker 160, in addition to the communication interface 110, the display 120, the memory 130, and the processor 140. However, such configurations are examples, and new configurations may be added in addition to the configurations or some configurations may be omitted, according to embodiments.

The communication interface 110 may include at least one of a Wi-Fi module, a Bluetooth module, a wireless communication module, and an NFC module, a UWB module.

Specifically, the Wi-Fi module and the Bluetooth module may perform the communication by a Wi-Fi method and a Bluetooth module, respectively. In a case of using the Wi-Fi module or the Bluetooth module, various pieces of connection information such as SSID or session key may be transmitted or received first to allow the communication connection by using these, and then various pieces of information may be transmitted and received. In addition, the wireless communication module may perform the communication according to various communication standards such as IEEE, Zigbee, 3rd Generation (3G), 3rd Generation Partnership Project (3GPP), and Long Term Evolution (LTE). The NFC module may perform the communication by a near field communication (NFC) method using 13.56 MHz band among various RF-ID frequency bands of 135 kHz, 13.56 MHz, 433 MHz, 860 to 960 MHz, 2.45 GHz, and the like. In addition, the UWB module may perform the communication by the UWB method using a ultrawide band frequency band.

The input interface 150 may include circuitry and the processor 140 may receive a user command for controlling the operations of the electronic apparatus 100 through the input interface 150. Specifically, the input interface 150 may be configured with a microphone, a remote control signal receiver, and the like and may also be implemented in a form of being included in the display 120 as a touch screen.

The speaker 160 may output an audio. Specifically, the processor 140 may output various notification sounds or voice guide messages related to the operations of the electronic apparatus 100 through the speaker 160.

Figure 22:
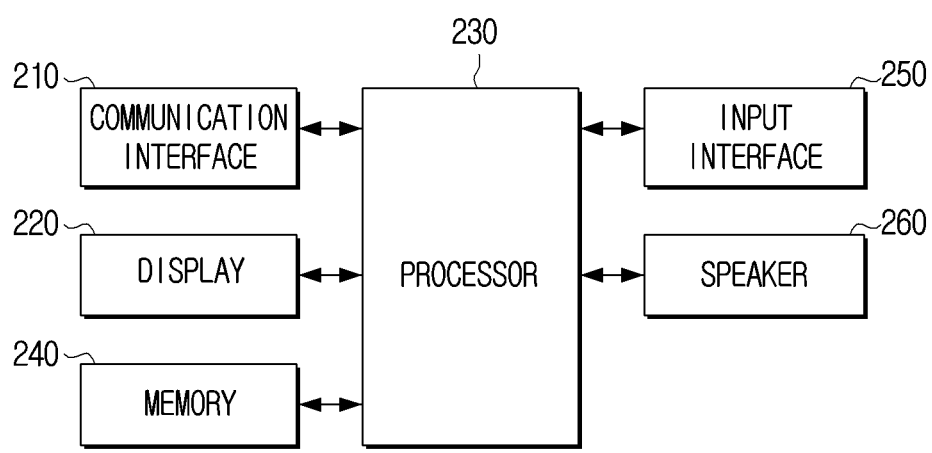
FIG. 22 is a block diagram illustrating a specific configuration of the display apparatus according to an embodiment.

FIG. 22 is a block diagram illustrating a specific configuration of the display apparatus according to an embodiment.

Referring to FIG. 22, the display apparatus 200 may further include a memory 240, an input interface 250, and a speaker 260, in addition to the communication interface 210, the display 220, and the processor 230. However, such configurations are examples, and new configurations may be added in addition to the above configurations or some configurations may be omitted, according to embodiments.

The memory 240 may store data used by at least one constituent element of the display apparatus 200. Here, the data may include, for example, software and various pieces of data related thereto. In this case, the memory 240 may include a volatile memory and a non-volatile memory. The software may include an operating system and an application. In embodiments, a memory 240 may include the memory 240, a ROM and a RAM in the processor 230, or a memory card (e.g., micro SD card or memory stick) mounted on the display apparatus 200.

Here, the application may include a view manager program. The view manager program is a program for displaying a plurality of images received from at least one electronic apparatus, that is, the execution screen, and may identify positions, sizes, number, and the like of the plurality of execution screens and display the plurality of execution screens on the display 220. In this case, the processor 230 may display the plurality of execution screens on the display 220 by using the view manager program.

The communication interface 210 may include at least one of a Wi-Fi module, a Bluetooth module, an NFC module, and a UWB module.

Specifically, the Wi-Fi module and the Bluetooth module may communicate by a Wi-Fi method and a Bluetooth method, respectively. In a case of using the Wi-Fi module or the Bluetooth module, various pieces of connection information such as SSID may be transmitted or received first to allow the communication connection by using these, and then various pieces of information may be transmitted and received. The NFC module may perform the communication by a near field communication (NFC) method using 13.56 MHz band among various RF-ID frequency bands of 135 kHz, 13.56 MHz, 433 MHz, 860 to 960 MHz, 2.45 GHz, and the like. In addition, the UWB module may perform the communication by the UWB method using a ultrawide band frequency band.

The input interface 250 may include circuitry and the processor 230 may receive a user command for controlling the operations of the display apparatus 200 through the input interface 250. Specifically, the input interface 250 may be configured with a microphone, a remote control signal receiver, and the like and may also be implemented in a form of being included in the display 220 as a touch screen.

The speaker 260 may output an audio. Specifically, the processor 230 may output various notification sounds or voice guide messages related to the operations of the display apparatus 200 through the speaker 260.

Figure 23:
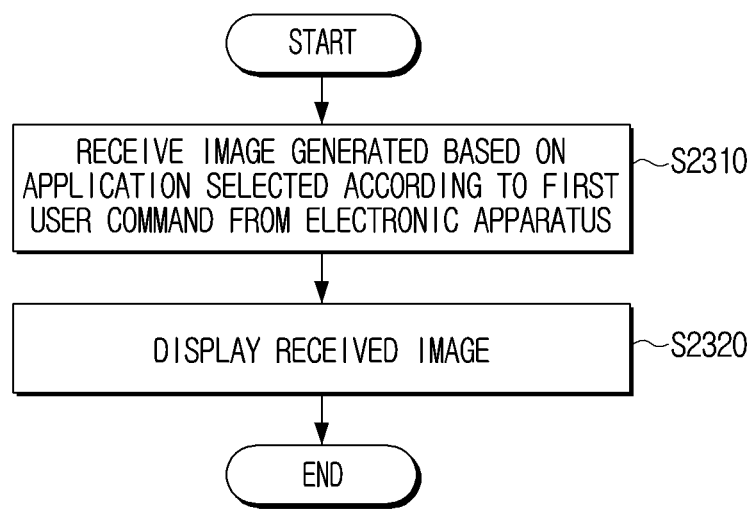
FIG. 23 is a flowchart illustrating a controlling method of the display apparatus according to an embodiment.

FIG. 23 is a flowchart illustrating a controlling method of the display apparatus according to an embodiment.

An image generated based on an application selected according to a first user command may be received from the electronic apparatus 100 at operation S2310.

The received image may be displayed at operation S2320.

Here, while the electronic apparatus 100 displays an image corresponding to a second user command input to the electronic apparatus, the image may be generated based on the application and transmitted to the display apparatus 200.

In embodiments, in operation S2320, in a case where an image generated based on the application and metadata of the application are received from the electronic apparatus 100, a category of the application may be identified based on the metadata and the received image may be displayed based on the identified category.

In addition, in operation S2320, when the plurality of images generated based on the plurality of applications are received, the plurality of received images may be displayed. Here, the plurality of images may be generated based on the plurality of applications of the electronic apparatus 100 or received from the electronic apparatus 100, or may be generated based on the plurality of applications of the plurality of electronic apparatuses and received from the plurality of electronic apparatuses.

Here, in embodiments, an arrangement state of the image displayed on the display apparatus may be determined based on an arrangement state of the electronic apparatus which displays the image generated based on each application.

In operation S2320, when the image generated based on the application is received from the electronic apparatus in a state where the plurality of images are displayed, one of the plurality of displayed images may be removed and the received image may be displayed.

In operation S2320, when the plurality of images are received from the plurality of electronic apparatuses, the positions of the plurality of images displayed may be identified based on the direction of the plurality of electronic apparatuses located based on or relative to the display apparatus 200, and the plurality of images may be displayed based on the identified positions.

In operation S2320, when the plurality of images are received from the plurality of electronic apparatuses, the number of displayed images may be identified based on the distance between the display apparatus 200 and the plurality of electronic apparatuses, and the identified number of images among the plurality of images may be displayed.

In embodiments, an example of a specific method in which the display apparatus 200 displays at least one image received from at least one electronic apparatus has been described above.

Figure 24:
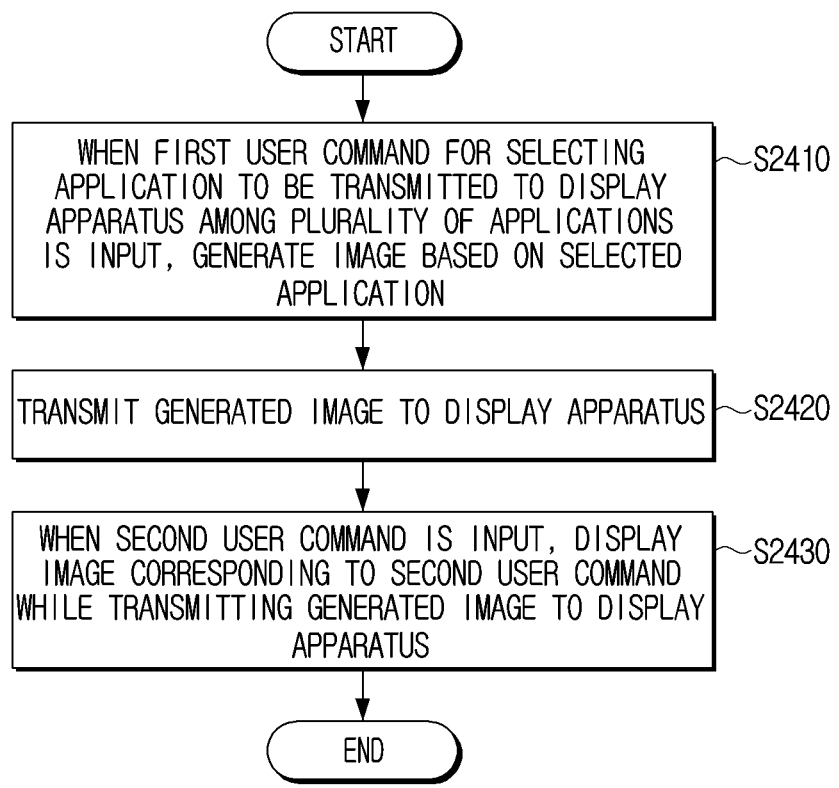
FIG. 24 is a flowchart illustrating a controlling method of the electronic apparatus according to an embodiment.

FIG. 24 is a flowchart illustrating a controlling method of the electronic apparatus according to an embodiment.

First, when the first user command for selecting the application to be transmitted to the display apparatus 200 among the plurality of applications is input, the image may be generated based on the selected application at operation S2410.

Hereinafter, the generated image may be transmitted to the display apparatus 200 at operation S2420.

When the second user command is input, the image corresponding to the second user command may be displayed while transmitting the generated image to the display apparatus 200 at operation S2430.

In embodiments, when the plurality of images displayed on the display apparatus 200 are received from the display apparatus 200, the plurality of received images may be displayed. Here, the plurality of images may be images that are generated based on the plurality of applications of the plurality of electronic apparatuses and transmitted to the display apparatus 200.

When the third user command for one image among the plurality of images is input, the third user command may be transmitted to the display apparatus 200.

The specific method in which the electronic apparatus 100 transmits at least one image to the display apparatus 200 and controls the image displayed on the display apparatus 200 has been described above.

According to an embodiment, the methods according to various embodiments disclosed in this disclosure may be provided in a computer program product. The computer program product may be exchanged between a seller and a purchaser as a commercially available product. The computer program product may be distributed in the form of a machine-readable storage medium (e.g., compact disc read only memory (CD-ROM)) or distributed online (e.g., downloaded or uploaded) through an application store (e.g., PlayStore™) or directly between two user devices (e.g., smartphones). In a case of the on-line distribution, at least a part of the computer program product (e.g., downloadable application) may be at least temporarily stored or temporarily generated in a machine-readable storage medium such as a memory of a server of a manufacturer, a server of an application store, or a relay server.

Each of the elements (e.g., a module or a program) according to various embodiments of the disclosure described above may include a single entity or a plurality of entities, and some sub-elements of the abovementioned sub-elements may be omitted or other sub-elements may be further included in various embodiments. Alternatively or additionally, some elements (e.g., modules or programs, may be integrated into one entity to perform the same or similar functions performed by each respective element prior to the integration.

Operations performed by a module, a program, or other elements, in accordance with various embodiments, may be performed sequentially, in a parallel, repetitive, or heuristically manner, or at least some operations may be performed in a different order, omitted, or may add a different operation.

In this disclosure, the term "unit" or "module" may include a unit implemented with hardware, software, or firmware and may be interchangeably used with terms, for example, logic, logic blocks, parts, or circuits. The "unit" or the "module" may be a part integrally formed or a minimum unit or a part of the part performing one or more functions. For example, the module may be implemented as an application-specific integrated circuit (ASIC).

Various embodiments of the disclosure may be implemented as software including instructions stored in machine-readable storage media, for example a non-transitory computer-readable medium. The machine is an apparatus which invokes instructions stored in the storage medium and is operated according to the invoked instructions, and may include an electronic apparatus (e.g., electronic apparatus 100) according to the disclosed embodiments.

In a case where the instruction is executed by a processor, the processor may perform a function corresponding to the instruction directly or using other elements under the control of the processor. The instruction may include a code made by a compiler or a code executable by an interpreter.

While embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. A display apparatus comprising:
a communication interface;
a display; and
a processor configured to, based on a first image being received from an electronic apparatus through the communication interface, display the received first image on the display,
wherein the first image is generated based on a first application selected according to a first user command, and is transmitted to the display apparatus while the electronic apparatus displays a second image corresponding to a second user command input to the electronic apparatus,
wherein the second image is generated based on a second application different from the first application,
wherein the first image is not displayed on the display of the electronic apparatus while the first image is displayed on the display apparatus,
wherein the second image is not displayed on the display apparatus while the second image is displayed on the display of the electronic apparatus,
wherein the second image includes a home screen of the electronic apparatus.

2. The display apparatus according to claim 1, wherein the processor is further configured to:
based on the first image and metadata of the first application being received from the electronic apparatus through the communication interface, identify a category of the first application based on the metadata; and
display the received first image on the display based on the identified category.

3. The display apparatus according to claim 1, wherein the processor is further configured to:
based on a plurality of third images being received through the communication interface, display the plurality of third images on the display,
wherein the plurality of third images are generated based on a plurality of applications, and
wherein the plurality of third images are received from the electronic apparatus, or received from each of a plurality of electronic apparatuses.

4. The display apparatus according to claim 3, wherein an arrangement state of the plurality of third images is determined based on an arrangement state of the electronic apparatus which displays a third image generated based on each application.

5. The display apparatus according to claim 3, wherein the processor is further configured to, based on the first image being received from the electronic apparatus through the communication interface while the plurality of third images are displayed on the display, remove one of the plurality of third images and display the received first image on the display.

6. The display apparatus according to claim 3, wherein the processor is further configured to:
based on the plurality of third images being received from the plurality of electronic apparatuses, identify positions of the plurality of third images to be displayed on the display based on directions in which the plurality of electronic apparatuses are located relative to the display apparatus; and
display the plurality of third images on the display based on the identified positions.

7. The display apparatus of claim 1, wherein the processor is further configured to determine a distance between the display apparatus and the electronic apparatus, and
determine whether to display the received image on the display based on the distance between the display apparatus and the electronic apparatus.

8. A display apparatus comprising:
a communication interface;
a display; and
a processor configured to:
based on a first image being received from an electronic apparatus through the communication interface, display the received first image on the display, and
based on a plurality of third images being received from each of a plurality of electronic apparatuses, identify a number of images to be displayed on the display based on a distance between the display apparatus and the plurality of electronic apparatuses, and
display the identified number of images among the plurality of third images on the display,
wherein the first image is generated based on an application selected according to a first user command, and is transmitted to the display apparatus while the electronic apparatus displays a second image corresponding to a second user command input to the electronic apparatus,
wherein the first image is not displayed on the display of the electronic apparatus while the first image is displayed on the display apparatus,
wherein the second image is not displayed on the display apparatus while the second image is displayed on the display of the electronic apparatus, and
wherein the plurality of third images are generated based on a plurality of applications.

9. An electronic apparatus comprising:
a memory;
a display;
a communication interface; and
a processor configured to:
based on a first user command for selecting a first application to be transmitted to a display apparatus among a plurality of applications stored in the memory, generate a first image based on the selected first application;
transmit the generated first image to the display apparatus through the communication interface;
based on a second user command for selecting a second application different from the first application, generate a second image based on the selected second application; and
display the second image corresponding to the second user command on the display while transmitting the generated first image to the display apparatus,
wherein the first image is not displayed on the display of the electronic apparatus while the first image is displayed on the display apparatus,
wherein the second image is not displayed on the display apparatus while the second image is displayed on the display of the electronic apparatus, and
wherein the second image includes a home screen of the electronic apparatus.

10. The electronic apparatus according to claim 9, wherein the processor is further configured to, generate a plurality of third images based on a selected plurality of applications; and
transmit the generated plurality of third images to the display apparatus through the communication interface while display the second image on the display of the electronic apparatus.

11. The electronic apparatus according to claim 10, wherein the processor is further configured to, based on a third user command corresponding to one image among the plurality of third images being input, transmit the third user command to the display apparatus through the communication interface.

12. A method for controlling a display apparatus, the method comprising:
receiving a first image from an electronic apparatus; and
displaying the received first image,
wherein the first image is generated based on a first application selected according to a first user command, and transmitted to the display apparatus, while the electronic apparatus displays a second image corresponding to a second user command input to the electronic apparatus,
wherein the second image is generated based on a second application different from the first application,
wherein the first image is not displayed on the display of the electronic apparatus while the first image is displayed on the display apparatus,
wherein the second image is not displayed on the display apparatus while the second image is displayed on the display of the electronic apparatus,
wherein the second image includes a home screen of the electronic apparatus.

13. The method according to claim 12, wherein the displaying comprises, based on the first image and metadata of the first application being received from the electronic apparatus, identifying a category of the first application based on the metadata and displaying the first image based on the identified category.

14. The method according to claim 12, wherein the displaying comprises, based on a plurality of third images being received, displaying the plurality of third images, wherein the plurality of third images are generated based on a plurality of applications, and wherein the plurality of third images are received from the electronic apparatus or received from each of a plurality of electronic apparatuses.

15. The method according to claim 14, wherein an arrangement state of the plurality of third images is determined based on an arrangement state of the electronic apparatus which displays a third image generated based on each application.

16. The method according to claim 14, wherein the displaying comprises, based on the first image being received from the electronic apparatus while the plurality of third images are displayed on the display, removing one of the plurality of displayed third images and displaying the first image.

17. A method for controlling an electronic apparatus, the method comprising:

based receiving on a first user command for selecting a first application, generating a first image based on the first application;

transmitting the first image to a display apparatus;

based on a second user command for selecting a second application different from the first application, generating a second image based on the selected second application; and displaying the second image corresponding to the second user command on a display of the electronic apparatus while the first image is displayed on the display apparatus, wherein the first image is not displayed on the display of the electronic apparatus while the first image is displayed on the display apparatus, wherein the second image is not displayed on the display apparatus while the second image is displayed on the display of the electronic apparatus, and wherein the second image includes a home screen of the electronic apparatus.

18. The method of claim 17, wherein the first image is an execution image of the first application.

19. The method of claim 17, wherein a display position of the first image with on the display apparatus is determined based on a physical position of the electronic apparatus with respect to the display apparatus.

20. The method of claim 19, wherein the first image is displayed on the display apparatus along with a plurality of images corresponding to a plurality of electronic apparatuses, and wherein the display position of the first image is further determined based on physical positions of the plurality of electronic apparatuses with respect to the display apparatus.

* * * * *